(12) United States Patent
Gentile

(10) Patent No.: US 10,860,721 B1
(45) Date of Patent: Dec. 8, 2020

(54) INFORMATION SECURITY MANAGEMENT IMPROVEMENT SYSTEM

(71) Applicant: Mike Gentile, San Clemente, CA (US)

(72) Inventor: Mike Gentile, San Clemente, CA (US)

(*) Notice: Subject to any disclaimer, the term of this patent is extended or adjusted under 35 U.S.C. 154(b) by 194 days.

(21) Appl. No.: 15/971,797

(22) Filed: May 4, 2018

Related U.S. Application Data

(60) Provisional application No. 62/501,249, filed on May 4, 2017.

(51) Int. Cl.
| | |
|---|---|
| G06F 21/57 | (2013.01) |
| G06Q 10/06 | (2012.01) |
| H04L 29/06 | (2006.01) |
| G09B 7/00 | (2006.01) |
| G06F 16/22 | (2019.01) |

(52) U.S. Cl.
CPC ........ *G06F 21/577* (2013.01); *G06F 16/2237* (2019.01); *G06Q 10/0635* (2013.01); *G09B 7/00* (2013.01); *H04L 63/1433* (2013.01); *H04L 63/20* (2013.01); *G06F 2221/034* (2013.01)

(58) Field of Classification Search
CPC ............................ H04L 63/1433; H04L 63/20
See application file for complete search history.

(56) References Cited

U.S. PATENT DOCUMENTS

| | | | |
|---|---|---|---|
| 6,877,034 B1 | 4/2005 | Manchin et al. | |
| 6,925,443 B1* | 8/2005 | Baggett, Jr. ........... | G06F 21/577 705/1.1 |
| 7,203,693 B2 | 4/2007 | Carlbom et al. | |
| 7,711,623 B2 | 5/2010 | Smith et al. | |
| 7,953,624 B2 | 5/2011 | Kunnes | |
| 8,375,199 B2* | 2/2013 | Young ................. | H04L 63/1433 713/100 |
| 9,092,787 B2 | 7/2015 | Moss | |
| 9,183,563 B2 | 11/2015 | Basir | |
| 9,224,286 B2 | 12/2015 | Shapiro et al. | |
| 9,280,669 B2 | 3/2016 | Chauhan et al. | |
| 9,298,780 B1 | 3/2016 | Madhani et al. | |
| 9,747,570 B1* | 8/2017 | Vescio ................. | G06F 21/577 |
| 9,760,849 B2 | 9/2017 | Vinnakoaa et al. | |
| 10,171,510 B2* | 1/2019 | O'Reilly ................. | H04L 63/20 |
| 2005/0131828 A1* | 6/2005 | Gearhart ............... | G06Q 40/08 705/50 |
| 2006/0117388 A1* | 6/2006 | Nelson .................. | G06F 21/577 726/25 |
| 2008/0047016 A1* | 2/2008 | Spoonamore .......... | G06Q 10/06 726/25 |

(Continued)

*Primary Examiner* — James R Turchen
(74) *Attorney, Agent, or Firm* — Advantage IP Law Firm

(57) ABSTRACT

Systems, methods, and non-transitory mediums for assessing and improving the information security management health of an organization may be used to generate a baseline assessment measuring a level of compliance with proper security framework elements as well as a level of cross-management, interaction, or engagement across four essential information security domains including a benchmark domain, a measurement domain, a decision domain, and an execution domain using a domain-element table with a plurality of measurement types associated with criteria for progressing through an increasing level of difficulty tiered scoring system established by selected frameworks, policies, standards, and guidelines while also providing a path to improve upon a baseline assessment.

17 Claims, 26 Drawing Sheets

(56) References Cited

U.S. PATENT DOCUMENTS

| | | | |
|---|---|---|---|
| 2010/0114634 A1* | 5/2010 | Christiansen | G06Q 30/018 |
| | | | 705/7.28 |
| 2011/0137987 A1* | 6/2011 | Tyree | G06Q 10/10 |
| | | | 709/204 |
| 2011/0145885 A1* | 6/2011 | Rivers | G06Q 10/10 |
| | | | 726/1 |
| 2011/0191138 A1* | 8/2011 | Saraf | G06Q 10/00 |
| | | | 705/7.28 |
| 2012/0053982 A1* | 3/2012 | Treacey | G06Q 10/0635 |
| | | | 705/7.28 |
| 2013/0283336 A1* | 10/2013 | Macy | G06F 21/577 |
| | | | 726/1 |
| 2015/0356477 A1* | 12/2015 | Milkman | G06Q 10/0633 |
| | | | 705/7.27 |
| 2016/0140466 A1* | 5/2016 | Sidebottom | G06Q 10/0635 |
| | | | 705/7.28 |
| 2017/0244740 A1* | 8/2017 | Mahabir | H04L 63/0428 |
| 2018/0270265 A1* | 9/2018 | Sage | H04L 63/1433 |

\* cited by examiner

| Rating Range 66a | Rating Name 66b | Rating Description 66c |
|---|---|---|
| 300-310.08 66d | Undefined Security Program with Limited Decision Capability 66e | The security program system is undefined and there is a limited ability to make or implement security related decisions within the environment 66f |
| 310.09-340.31 66g | Defined Security Program with Limited Decision Capability 66h | The security program system is defined but there is still a limited ability to make or implement security related decisions within the environment 66i |
| 340.32-765 66j | Performed Security Program with Ad-hoc Decision Capability 66k | The security program system is defined and operationally performed leading to some decision making and execution capability within the environment. 66l |
| 765.01-784.39 66m | Performed and Measured Security Program with Ad-hoc Decision Capability 66n | The security program system is defined and operationally performed including the ability to measure the security posture of the organization. This capability creates a significant foundation to enable decision making and execution capability within the environment. 66o |
| 784.40-786.37 66p | Performed and Measured Security Program with Moderate Decision Making Capability 66q | The security program system is defined and operationally performed including the ability to measure the security posture of the organization. In addition to this measurement capability, the organization has had its security posture measured utilizing these measurement processes. This capability creates both a significant foundation and supporting input data to enable decision making and execution capability within the environment. 66r |
| 786.38-806.91 66s | Informing Security Program with Effective Decision Making Capability 66t | The implemented security program system can collect measurement information of the security posture within the environment and then effectively communicating this information to stakeholders. This situation creates an environment that enables a significant ability for stakeholders to make informed decisions about information security within the environment. 66u |
| 806.92-839.34 66v | Improving Security Program with Effective Decision Making and Execution Capability 66w | The implemented security program system can collect measurement information of the security posture within the environment and then effectively communicating this information to stakeholders. This situation creates an environment that enables a significant ability for stakeholders to make informed decisions about information security within the environment. Further, once these decisions are made, there is a strong capability and ability to implement these decisions once made. 66x |
| 839.35-850 66y | Systemic Security Program with Perfected Decision Making and Execution Capability 66z | The decision and execution capability of the security program system within the environment is systemic with a strong ability for the organization to improve over time attributed to effective decision making by security program stakeholders. 66aa |

FIG. 4

| Element Score 72a | Running Score 72b | Rating Level 72c | Domain 72d | Measurement Type 72e | Element Description 72f |
|---|---|---|---|---|---|
| 5.04 74a | 305.04 74b | Undefined Security Program with Limited Decision Capability 74c | Benchmark 74d | Base 74e | There is a documented benchmark framework that illustrates all the relationships between all security policy, standards, guidelines, program, program charter, and processes in the environment. 74f |
| 5.04 76a | 310.08 76b | Undefined Security Program with Limited Decision Capability 76c | Benchmark 76d | Base 76e | The documented benchmark framework must be derived from applicable regulatory and business requirements of the organization, as well as best practice standards within the information security domain. 76f |
| End of Tier 1 (64b) ||||||
| 5.04 78a | 315.12 78b | Defined Security Program with Limited Decision Capability 78c | Benchmark 78d | Base 78e | All security policy, standards, guidelines, program, program charter, and processes must be documented in the environment and derived from a current documented benchmark framework 78f |
| 7.92 80a | 323.04 80b | Defined Security Program with Limited Decision Capability 80c | Execution 80d | Base 80e | The security program must have a defined sub-program for a dedicated security project management that aligns to best practice. 80f |
| 3.96 82a | 327 82b | Defined Security Program with Limited Decision Capability 82c | Decision 82d | Base 82e | The communication system must be documented in the security program charter 82f |
| 8.67 84a | 335.67 84b | Defined Security Program with Limited Decision Capability 84c | Measurement 84d | Connector 84e | The measurement program must utilize the security 84f policies and standards ratified for the organization as the benchmark for measurement in all measurement processes |
| End of Tier 2 (64c) ||||||

FIG. 5A

| Element Characteristics 72g | Common Element Deliverables 72h | Correlation to CISOSHARE Framework 72i |
|---|---|---|
| -Defined wireframe that illustrates the relationship between each security policy, program, charter, standard, or process document within the organization. 74g | -Security Documentation Map -Research Supporting Analysis of Framework Drivers 74h | -Security Framework Map -Program Kick-off -Program assessment 74i |
| -The framework should be aligned to organizational objectives -The framework should be aligned to application regulations and best practice frameworks 76g | -Security Documentation Map -Research Supporting Analysis of Framework Drivers 76h | Security Process Guide - Policy Management process 76i |
| End of Tier 1 (64b) | | |
| -A review of the security documentation for the environment will align to the documented benchmark framework. 78g | Documented Security Policy and Standards Document 78h | Security Policy and Standards Document 78i |
| -The dedicated project capability within the environment will have a defined scope, roles and responsibilities, as well as mission and mandate. 80g | -Documented review of implemented project management function program and processes 80h | -Defined Security Program Project Management Capability 80i |
| -The communication system for the security program will be defined in the security program charter with identified stakeholders that will receive communication, communication mechanisms for transferring information and defined communication artifacts. 82g | Security program charter 82h | -Security Program Charter -Defined communication system 82i |
| -A review of the measurement processes in the environment demonstrate use of the ratified documentation set as the element of measurement. 84g | -Documented Measurement Processes 84h | Security Process Guide- Sub-program Processes 84i |
| End of Tier 2 (64c) | | |

FIG. 5B

| | Element Score 72a | Running Score 72b | Rating Level 72c | Domain 72d | Measurement Type 72e | Element Description 72f |
|---|---|---|---|---|---|---|
| 70h | 5.04 86a | 340.71 86b | Performed Security Program with Ad-hoc Decision Capability 86c | Benchmark 86d | Base 86e | The security program charter must identify and define all supporting sub-programs of work within the security effort. 86f |
| 70i | 5.04 88a | 345.75 88b | Performed Security Program with Ad-hoc Decision Capability 88c | Benchmark 88d | Base 88e | All security policy, standards, guidelines, program, program charter, and processes must be ratified by defined stakeholders within the environment. 88f |
| 70j | 5.04 90a | 350.79 90b | Performed Security Program with Ad-hoc Decision Capability 90c | Benchmark 90d | Base 90e | All ratified security policy, standards, guidelines, program, program charter, and processes must be what is utilized within the environment. 90f |
| 70k | 5.04 92a | 355.83 92b | Performed Security Program with Ad-hoc Decision Capability 92c | Benchmark 92d | Base 92e | All security policy, standards, guidelines and processes must relate to each other in a hierarchal manner. Security policy statements must incorporate security standards or guidelines and must be unique with no duplicated or contradictory statements. 92f |
| 70l | 5.04 94a | 360.87 94b | Performed Security Program with Ad-hoc Decision Capability 94c | Benchmark 94d | Base 94e | All underlying sub-programs identified within the security program charter must define all of the processes that are included within them. 94f |
| | | | End of Tier 3 (64d) | | | |
| 70m | 405.04 96a | 765.91 96b | Performed and Measured Security Program with Ad-hoc Decision Capability 96c | Benchmark 96d | Base 96e | All the processes identified by a sub-program within the security effort must be appropriately documented. 96f |
| 70n | 5.04 98a | 770.95 98b | Performed and Measured Security Program with Ad-hoc Decision Capability 98c | Benchmark 98d | Base 98e | There is a defined Management process for establishing, reviewing and modifying the benchmark framework for the environment 98f |

| Element Characteristics 72g | Common Element Deliverables 72h | Correlation to CISOSHARE Framework 72i |
|---|---|---|
| -The charter will align to the ratified benchmark framework and therefore will identify all applicable programs for the security program. 86g | -Documented Security Program Charter 86h | Security Program Charter 86i |
| -All utilized security documentation in the environment will have been ratified by the implemented security documentation ratification process. 88g | Documented Security Policy and Standards Document 88h | Security Process Guide - Policy Management process 88i |
| -A review of the security documentation in use for the environment will align to the ratified documented benchmark framework. 90g | Documented Security Policy and Standards Document 90h | Security Policy and Standards Document 90i |
| -A review of the security documentation for the environment will align to the documented benchmark framework. 92g | Documented Security Policy and Standards Document 92h | Security Policy and Standards Document 92i |
| - Each identified sub-program in the charter will identify each process included within the sub-program. 94g | -Documented Security Program Charter 94h | Security Program Charter 94i |
| End of Tier 3(64d) | | |
| -Each defined and documented process within a sub-program will have all business rules, included tools, roles and responsibilities and step by step procedures. 96g | -Documented Security Program Processes 96h | Security Process Guide- Measurement Processes 96i |
| -The process must be documented according to organizational policy<br>-The process must include documented business rules, included tools, roles and responsibilities and step by step procedures.<br>-There must be adequate resources with requisite skills, and availability, as well as evidence that the process is performed as designed. 98g | -Defined Policy Framework Management Process 98h | Security Process Guide - Policy Management Process 98i |

FIG. 6B

| | Element Score 72a | Running Score 72b | Rating Level 72c | Domain 72d | Measurement Type 72e | Element Description 72f |
|---|---|---|---|---|---|---|
| 70o | 1.98 100a | 772.93 100b | Performed and Measured Security Program with Ad-hoc Decision Capability 100c | Measurement 100d | Base 100e | The measurement processes enable measurement across an entire organization including all business units and areas of management 100f |
| 70p | 1.98 102a | 774.91 102b | Performed and Measured Security Program with Ad-hoc Decision Capability 102c | Measurement 102d | Base 102e | The measurement processes must be defined within a security risk management program that is identified and defined within the security program charter. 102f |
| 70q | 1.98 104a | 776.89 104b | Performed and Measured Security Program with Ad-hoc Decision Capability 104c | Measurement 104d | Base 104e | The measurement processes must be documented with all business rules, included tools, roles and responsibilities and step by step procedures. 104f |
| 70r | 9.47 106a | 786.36 106b | Performed and Measured Security Program with 106c Moderate Decision-Making Capability | Measurement 106d | Base 106e | The measurement processes must utilize a consistent measurement methodology that is defined. 106f |
| | | | End of Tier 4 (64e) | | | |

FIG. 7A

| Element Characteristics 72g | Common Element Deliverables 72h | Correlation to CISOSHARE Framework 72i |
|---|---|---|
| -The defined scope of the measurement program for the organization is inclusive of any organizational area that stores, utilizes, manages or transmits information or data on behalf of an organization.<br><br>100g | -Measurement Program Definition Document<br><br>100h | Security Program Charter<br><br>100i |
| -The measurement program for the organization aligns to the benchmark framework and is defined within the security program charter for the organization. 102g | -Security Program Charter<br><br>102h | Security Program Charter 102i |
| -Each defined and documented measurement process within the measurement program will have all business rules, included tools, roles and responsibilities and step by step procedures. 104g | -Documented Measurement Processes 104h | Security Process Guide- Measurement Processes 104i |
| -A review of the utilized measurement methodology within each measurement process should be defined in the measurement process documentation<br>-The defined measurement methodology should be aligned with the objective of the process. 106g | Documented review of implemented measurement processes<br><br>106h | Security Process Guide- Measurement Processes<br><br>106i |
| End of Tier 4(64e) | | |

FIG. 7B

| Element Characteristics 72g | Common Element Deliverables 72h | Correlation to CISOSHARE Framework 72i |
|---|---|---|
| -A central database of findings from measurement activities must be implemented.<br>-This database should be inclusive of findings from all measurement activities. 108g | Centralized security findings database 108h | Security Findings Database 108i |
| -The centralized findings database management process will have all business rules, included tools, roles and responsibilities and step by step procedures. 110g | Centralized findings database Management process 110h | Defined Process 110i Performance- Project Portfolio Management |
| -A review of the centralized findings database management process demonstrates that at least 99.9% of the findings identified from all measurement activities are managed. Common in scope processes include:<br>- All 3rd parties or suppliers that manage, transmit or store confidential information on behalf of the organization.<br>-Any systems owned by the organization, at the application, database, network, operating system, and physical layers that manage, transmit or store confidential information on behalf of the organization.<br>-Across all business units utilizing a recognized framework such as ISO 27001 or NIST 800-53<br>-On all project based risk assessments<br>-3rd party or supplier risk assessments<br>-Any regulatory related risk assessments in which the organization is subjected.<br>-All policy exception risk assessments for any system or processes that are still in the production environment. 112g | Review of centralized findings database. 112h | Implemented Security Findings Database 112i |

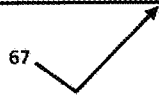

FIG. 8B

| Element Score 72a | Running Score 72b | Rating Level 72c | Domain 72d | Measurement Type 72e | Element Description 72f |
|---|---|---|---|---|---|
| 8.67 114a | 800.97 114b | Informing Security Program with Effective Decision-Making Capability 114c | Decision 114d | Connector 114e | The central management capability must integrate into the communication system for the organization and aggregated findings must be integrated into stakeholder reporting. 114f |
| 3.96 116a | 804.93 116b | Informing Security Program with Effective Decision-Making Capability 116c | Decision 116d | Base 116e | The communication system must present information in a way it supports informed decision making. 116f |
| | | | End of Tier 5 (64f) | | |
| 3.96 118a | 808.89 118b | Improving Security Program with Effective Decision Making and Execution Capability 118c | Decision 118d | Base 118e | The stakeholders of the security effort, defined in the security program charter, must make security related decisions utilizing the communication system 118f |
| 1.98 120a | 810.87 120b | Improving Security Program with Effective Decision Making and Execution Capability 120c | Measurement 120d | Base 120e | The measurement processes must be resourced appropriately so that they can perform at least 99.9% of the required assessments within the environment. 120f |
| | | | End of Tier 6 (64g) | | |

FIG. 9A

| Element Characteristics 72g | Common Element Deliverables 72h | Correlation to CISOSHARE Framework 72i |
|---|---|---|
| -A review of the centralized findings database management process demonstrates that there are process steps for integrating aggregated findings data into the organization communication system.<br>-A review of the stakeholder reporting from the communication system is inclusive of relevant findings data from the centralized findings database. 114g | -Review of centralized findings database Management process.<br>-Review of the stakeholder reporting within the defined communication process 114h | -Defined Centralized Findings Database Management Process- Resourcing<br>-Security Program Charter 114i |
| -A review of the reporting artifacts within the communication system will show evidence of the decisions that were to be evoked from the information.<br>-For each of those decision points, all required content, required stakeholders to make the decision, and the delivery mechanism will be appropriate to enable a decision to be made. 116g | -Defined security program system 116h | -Security Program Charter<br>-Defined communication system 116i |
| End of Tier 5 (64f) | | |
| -A review of the performance of the communication system demonstrates that the proposed decisions that were evoked were made. 118g | -Review of the effectiveness of stakeholder reporting within the defined communication process 118h | -Security Program Charter<br>-Defined communication system 118i |
| -A review of the measurement processes in the environment demonstrate that they perform at least 99.9% of the scheduled assessments with the process for the environment. 120g | Documented review of implemented measurement processes 120h | Defined Process Performance- Resourcing 120i |
| End of Tier 6(64f) | | |

FIG. 9B

| | Element Score 72a | Running Score 72b | Rating Level 72c | Domain 72d | Measurement Type 72e | Element Description 72f |
|---|---|---|---|---|---|---|
| 70z | 1.98 122a | 812.85 122b | Improving Security Program with Effective Decision Making and Execution Capability 122c | Measurement 122d | Base 122e | The measurement processes must be implemented in the environment as designed, defined and documented. 122f |
| 70aa | 1.98 124a | 814.83 124b | Improving Security Program with Effective Decision Making and Execution Capability 124c | Measurement 124d | Base 124e | The central findings management processes must be resourced appropriately so that at least 99.9% of produced findings are managed within the database. 124f |
| 70ab | 7.92 126a | 822.75 126b | Improving Security Program with Effective Decision Making and Execution Capability 126c | Execution 126d | Base 126e | The security program must have a dedicated security project management capability that is adequately resourced. 126f |
| 70ac | 8.67 128a | 831.42 128b | Improving Security Program with Effective Decision Making and Execution Capability 128c | Execution 128d | Connector 128e | The security program must implement management decisions via the established project management capability defined for the security program. 128f |
| 70ad | 7.92 130a | 839.34 130b | Improving Security Program with Effective Decision Making and Execution Capability 130c | Execution 130d | Base 130e | All security program processes defined by the security program charter, as well as sub-programs must be adequately resourced, so they are performed as designed. 130f |
| | | | End of Tier 7(64h) | | | |
| 70ae | 10.66 132a | 850 132b | Systemic Security Program with Perfected Decision Making and Execution Capability 132c | Benchmark 132d | Connector 132e | On at least an annual basis, environment changes from the execution of business decisions, as well as environment changes associated with the organization, must be communicated as inputs into the benchmark framework Management process. 132f |
| | | | End of Tier 8(64i) and Return | | | |

FIG. 10A

| Element Characteristics 72g | Common Element Deliverables 72h | Correlation to 72i CISOSHARE Framework |
|---|---|---|
| -A review of the measurement processes in the environment align to what has been defined. 122g | Documented review of implemented measurement processes 122h | Security Process Guide- Measurement Processes 122i |
| -A review of the centralized findings database Management process demonstrates that there are adequate resources to perform the process as designed. 124g | Review of centralized findings database Management process. 124h | Defined Centralized Findings Database Management process- Resourcing 124i |
| -A review of the dedicated security project management capability in the environment demonstrate that they perform at least 99.9% of the scheduled assessments with the process for the environment. 126g | -Documented review of implemented project management function program and processes 126h | -Defined Dedicated Security Project Management Process Performance- Resourcing 126i |
| -A review of the dedicated security project management capability in the environment 128g demonstrate that they successfully managed at least 99.9% of the generated decisions evoked from the defined communication system for the environment. | -Documented review of performance associated with the project management of projects that were derived from decisions evoked within the communication system. 128h | -Defined Dedicated Security Project Management Process Performance- Resourcing 128i |
| -A review of all of the defined processes in the environment demonstrate that they are performed as designed. 130g | -Documented review of implemented security program processes in the environment. 130h | Defined Process Performance- Resourcing 130i |
| End of Tier 7 (64h) | | |
| -Security Process Guide - Security Program Review 132g | -Documented review of the implemented Security Program. 132h | Security Process Guide - Security Program Review Security Process Guide - Policy Management process 132i |
| End of Tier 8 (64i) and Return | | |

FIG. 10B

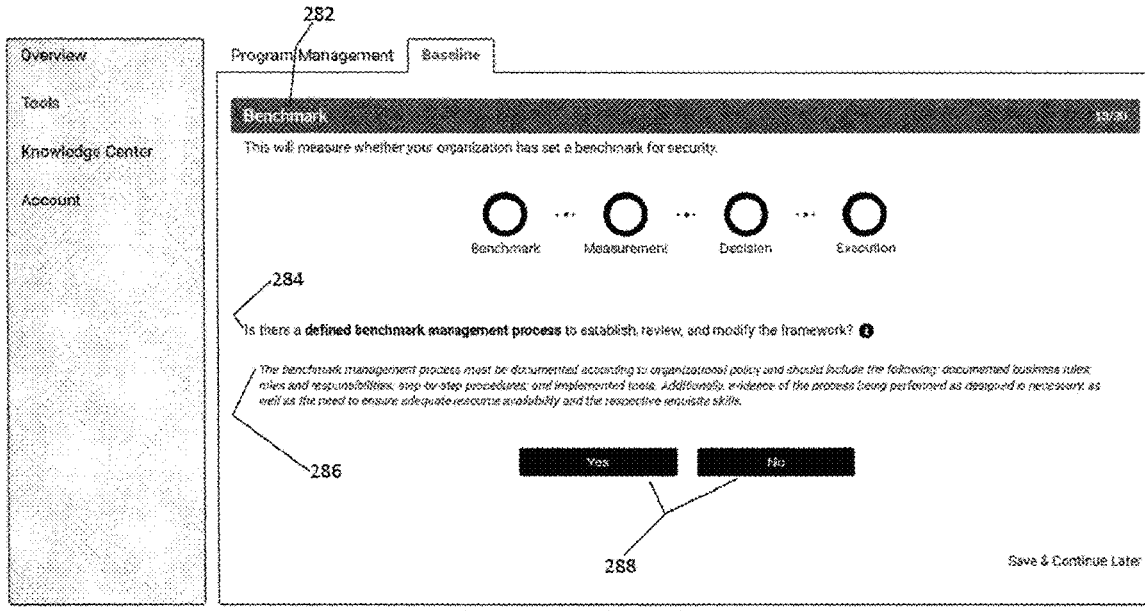
FIG. 14A (Benchmark)
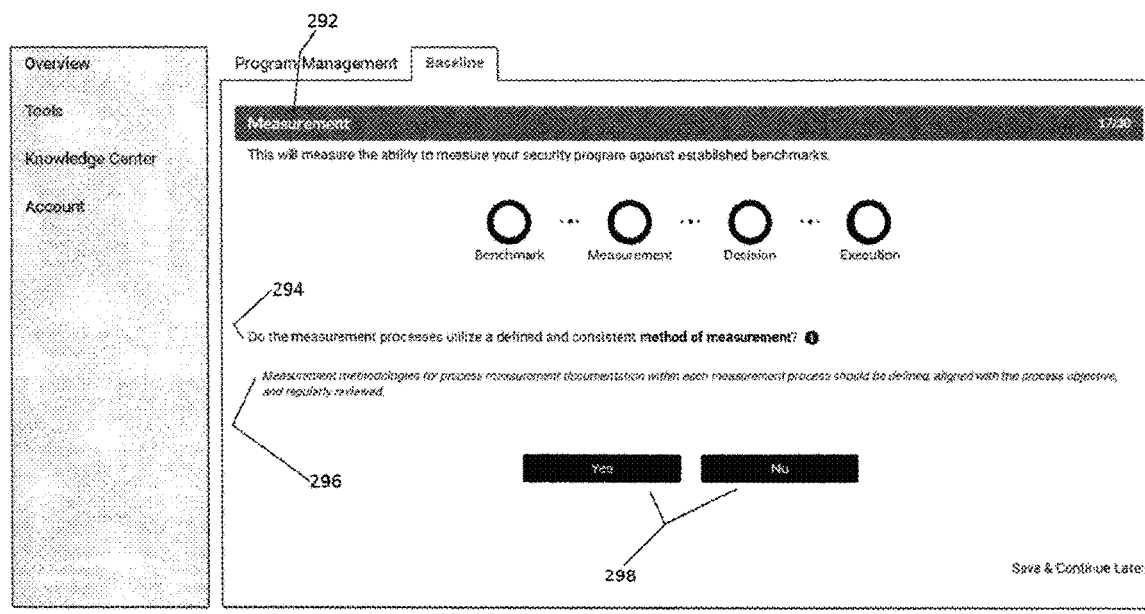
FIG. 14B (Measurement)

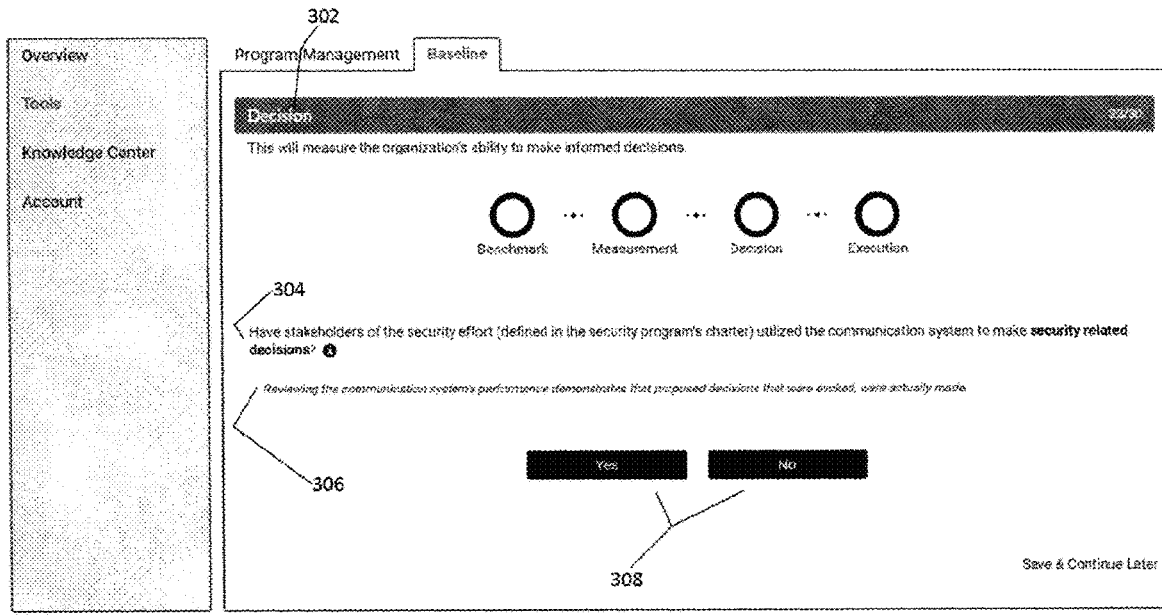
FIG. 14C (Decision)
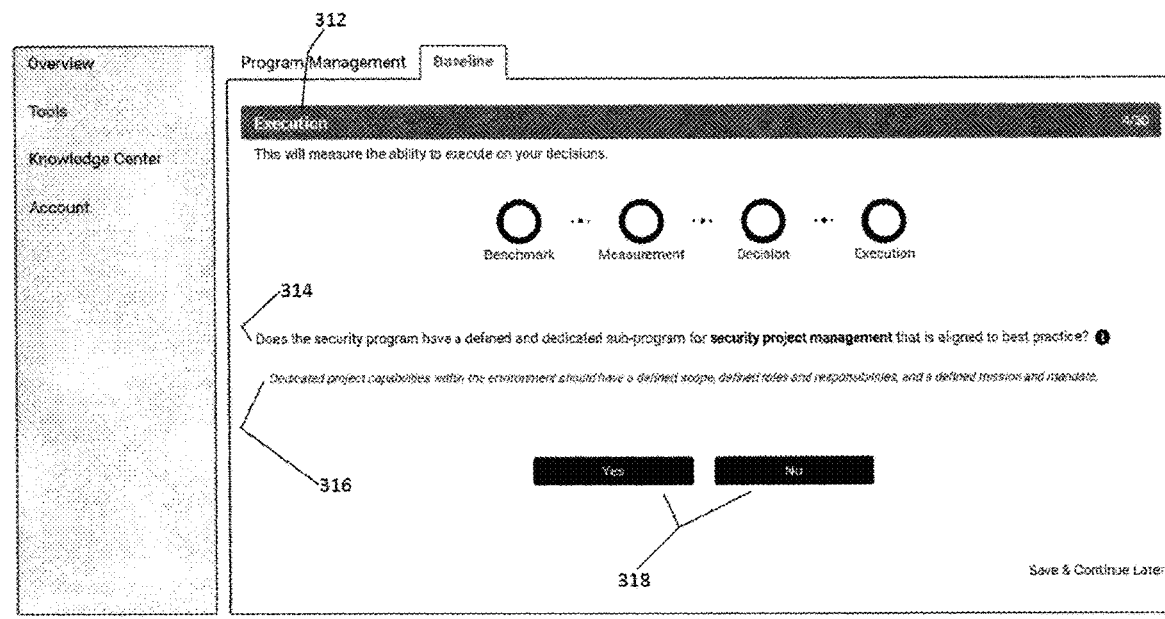
FIG. 14D (Execution)

| CHARACTERISTIC WEIGHING TABLE ||| 
|---|---|---|
| Domain | Base | Connector |
| 1. Benchmark | 5.04 | 10.66 |
| 2. Measurement | 1.98 | 8.67 |
| 3. Decision-making Capability | 3.96 | 8.67 |
| 4. Ability to Execute | 7.92 | 8.67 |

FIG. 15

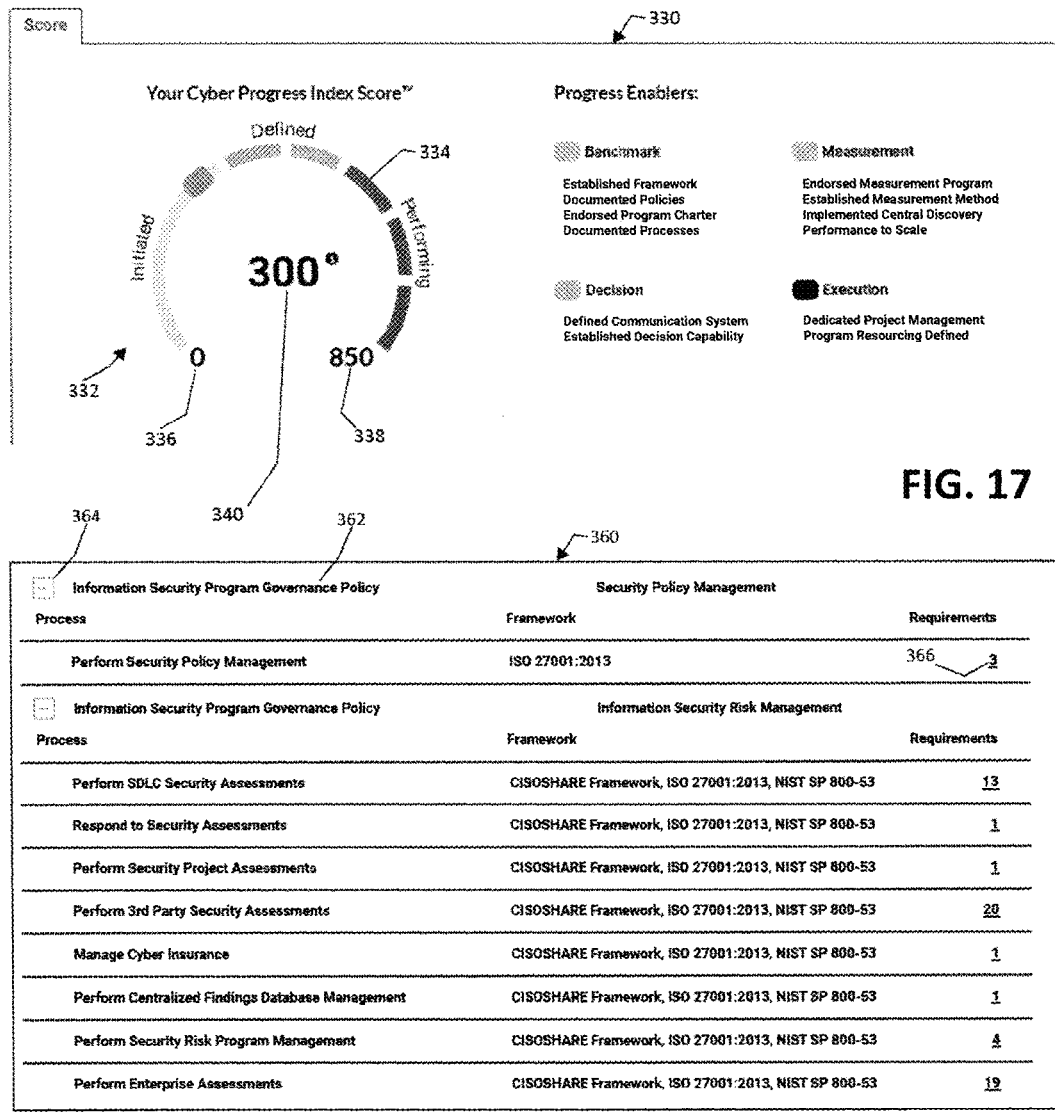
FIG. 17
FIG. 18
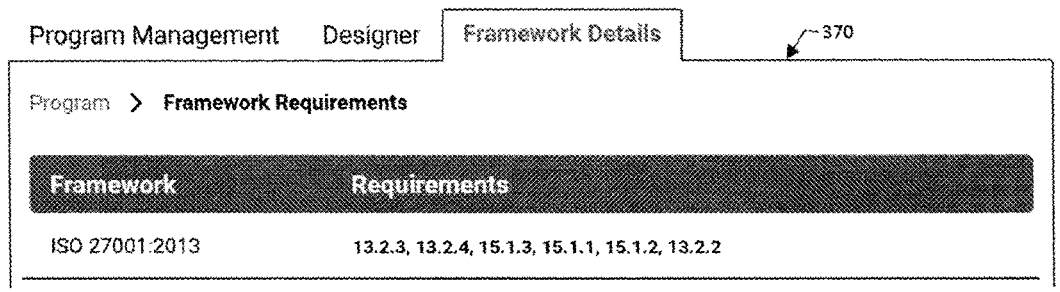
FIG. 19

INFORMATION SECURITY MANAGEMENT IMPROVEMENT SYSTEM

CROSS-REFERENCE TO OTHER APPLICATIONS

This application claims the benefit of U.S. Application No. 62/501,249, filed on May 4, 2017, entitled Information Security Management Health Assessment System, and which is hereby incorporated by reference in its entirety.

BACKGROUND OF THE INVENTION

1. Field of the Invention

The present invention relates to information security management systems, and more specifically, to systems and methods for assessing the overall health of an organization's information security system in terms of both the level of compliance and decision-making capabilities as well as providing a guide for improving such health once assessed.

2. Background Art

Many organizations are struggling with managing information security within their environments despite having several information security controls. However, without an information security management system (ISMS), controls tend to be somewhat disorganized and disjointed, having been implemented often as point solutions to specific situations or simply as a matter of convention. Security controls in operation typically address certain aspects of information technology (IT) or data security specifically; leaving non-IT information assets, such as paperwork and proprietary knowledge, less protected overall. Moreover, business continuity planning and physical security may be managed quite independently of IT or information security while human resources practices may make little reference to the need to define and assign information security roles and responsibilities throughout the organization.

In addition, these ISMS typically focus on the level of compliance areas of information security. For example, access controls are one category wherein an organization attempts to evaluate several factors such as physical and digital access to confidential information. Access control factors may include an evaluation of criteria such as locked areas, locked file cabinets, use of passwords, keypad entry, use of badges, restricted online permissions, and the like. Each factor is then individually rated for a level of compliance ranging from no compliance (not implemented or followed) to full compliance. Where compliance is inadequate, the organization may attempt to bolster that area of compliance through best practices. However, this method is often reactionary or results in a dedicated improvement to a single factor.

There are some frameworks within the information security domain that look to provide a systematic rating, or even certification for an information security environment. One exemplary framework is the ISO/IEC 27001. This framework was an ISMS standard published in October 2005 by the International Organization for Standardization (ISO) and the International Electrotechnical Commission (IEC). ISO/IEC 27001 formally specifies a management system that is intended to bring information security under explicit management control.

In general, the ISO/IEC 27001 framework requires that management: a) systematically examine the organization's information security risks, taking account of the threats, vulnerabilities, and impacts; b) design and implement a coherent and comprehensive suite of information security controls and/or other forms of risk treatment (such as risk avoidance or risk transfer) to address those risks that are deemed unacceptable; and c) adopt an overarching management process to ensure that the information security controls continue to meet the organization's information security needs on an ongoing basis. ISO/IEC 27001 also provides a catalog of security controls which are measured utilizing the ISMS.

Another similar framework to ISO/IEC 27001 but focusing more on healthcare is provided by the HITRUST CSF. This framework catalogs and aggregates many of the other available best practice frameworks utilized within healthcare organizations, such as ISO 27001, and NIST Special Publication 800-53, as well as the HIPAA Security Rule. This model interprets, cross matrixes, and aggregates all the related controls across each of these frameworks, and then presents prescriptive guidance on methods to implement the suggested controls within each of those frameworks. This approach strictly focuses on the implementation of these controls, as well as a certification process to attest that they are implemented.

Yet another framework more applicable to federal systems is provided by NIST Special Publication 800-53. NIST Special Publication 800-53 provides a catalog of security controls for all U.S. federal information systems except those related to national security. It is published by the National Institute of Standards and Technology. More specifically, NIST Special Publication 800-53 covers the steps in the Risk Management Framework that address security control selection for federal information systems in accordance with the security requirements in Federal Information Processing Standard (FIPS) 200. This includes selecting an initial set of baseline security controls based on a FIPS 199 worst-case impact analysis, tailoring the baseline security controls, and supplementing the security controls based on an organizational assessment of risk. The security rules cover seventeen areas including access control, incident response, business continuity, and disaster recoverability.

A key part of the certification and accreditation process for federal information systems is selecting and implementing a subset of the controls (safeguards) from the Security Control Catalog (NIST 800-53, Appendix F). These controls are the management, operational, and technical safeguards (or countermeasures) prescribed for an information system to protect the confidentiality, integrity, and availability of the system and its information. To implement the needed safeguards or controls, agencies must first determine the security category of their information systems in accordance with the provisions of FIPS 199, "Standards for Security Categorization of Federal Information and Information Systems." The security categorization of the information system (low, moderate or high) determines the baseline collection of controls that must be implemented and monitored. Agencies may adjust these controls and tailor them to fit more closely with their organizational goals or environments.

While there are many information security best practice and certifications systems currently available, such as the ISO 27001 or the NIST 800-53 framework discussed above, these systems only focus on creating a system to improve the compliance level compared to security best practices, which these frameworks define, within an environment. However, a functionally healthy security program must be able to perform at least four core functions including: 1) setting a benchmark for security, 2) providing the ability to measure against the benchmark, 3) enabling management decisions, and 4) supporting the execution of decisions. Unfortunately, the other systems discussed above do not focus on the way a security program performs the core four functions identified above. Even more significant, none of these other systems evaluate the capability of how these four core functions work together to improve informed decision making and the corresponding execution of those decisions by the organization within the environment once made. With current technology, organizations do not have a way of measuring their decision-making capability as there is no repeatable way to measure such decision-making capability.

One approach at assessing an information security governance of an enterprise may be found in U.S. Pat. No. 9,760,849 to Vinnakota et al. According to the Vinnakota et al. patent, an information security (IS) governance (practices to govern security of information and information assets of an enterprise) may be classified into sub-information security governances including an effective information security governance, an efficient information security governance, an accountable information security governance, and a responsive information security governance. Each sub-information security governance is then defined by focus areas including IS awareness, IS culture, IS decision making, IS management, IS strategy, IS policy, IS roles and responsibility, and IS competence. Each focus area is further broken into three control dimensions including preventive, detective, and reactive dimensions. Each of the sub-information security governances, focus areas, and control dimension are assigned weights. A questionnaire is sent out users over a distributed computer network to elicit response relative to each sub-information security governance, focus area, and control dimension. The responses are scored and aggregated for each sub-information security governance and then aggregated for the entire IS governance. The score may be compared to a benchmark or other enterprise and provides an assessment of an enterprises IS governance.

While the Vinnakota et al. patent provides a computer implemented tool for assessing a current compliance of an enterprise relative to IS guidelines, policies, standards, etc., such tool fails to also account for the level of management across several critical domains. In other words, Vinnakota et al. describes a system wherein a user is queried about compliance with an information security implementation, then scores the responses, and informs the user where the enterprise is falling short or exceeding expectations relative to a benchmark or other enterprise. While such tool may be useful for examining how compliant an enterprise is relative to established IS guidelines, policies, standards, etc., Vinnakota does not address a level of compliance in each of the four critical IS domains (i.e. benchmark, measurement, decision, and execution domains), and does not enforce a leveling up progression through an information security management system by imposing restraints on progressing up through a tiered level of IS management. While the Vinnakota et al. current compliance assessment may be an important first step in any IS management system, simply knowing where the enterprise stands does not provide a progression for improving or any checks or balances on the progression process to ensure a preferred level of cross-domain management and engagement.

From a review of the prior art solutions discussed above, what is not routine or well understood is the ability to repeatedly measure a level of compliance across four critical information security management domains as well as the level of cross-domain management, interactivity, or engagement using a progressive measurement tools allowing for a user to understand their current situation in terms of both level of compliance and level of cross-domain management, interactivity, or engagement while also providing a path for improving such situation. Given the drawbacks of the current approaches to information security management, there exists a need for a system and method that focuses on assessing selected aspects of an information security system, including the level of decision-making capability across critical functional domains in addition to the level of compliance, through the implementation of an indexing and rating system as well as providing systematic guidance for improving the decision-making capabilities regarding information security issues evident as a result of implementing the indexing and rating system.

SUMMARY

One aspect of this disclosure provides a system for improving the information security management system of an organization generally by performing a progressively difficult to satisfy inquiry across a group of information security domains in which sets of information security element criteria provide a basis for a list of questions which are weighted and assigned a first measurement type indicative of a characteristic being tied or related to specific domain or an alternative measurement type indicative of a characteristic that uses attributes from more than one security domain. Responses of a first manner are aggregated and compared to a progress index score for display on a user's graphical user interface to establish a baseline assessment.

In another aspect disclosed herein, tools are provided for improving the baseline assessment along the progress index. Such tools may include validating documents and re-taking the assessment after comporting with the requirements set forth by each set of information security element criteria.

Another aspect disclosed herein is the requirement of certain cross-domain management indicators prior to advancing further along the progress index.

Another aspect provides a method for improving the information security management system of an organization.

In yet another aspect disclosed herein, a non-transitory medium with computer-readable instructions is provided to assist in improving the information security management system of an organization.

In view of the foregoing, one object of the present invention is to provide an information security level of compliance and decision-making capability assessment.

Another object of the invention is to provide one or more tools for evaluating an organization's level of compliance and decision-making capability using an automated system accessible via a distributed computer network such as the internet.

Another object of the present invention is to assess the level of interaction and decision-making capabilities across critical functions or domains of an information security system.

A further object of the invention is to enable information security managers and consultants with a system for advising organizations with methods of improving their decision-making capabilities in an information security environment.

These and other objects of the invention, as well as many of the intended advantages thereof, will become more readily apparent when reference is made to the following description taken in conjunction with the accompanying figures.

Various embodiments of systems, methods and devices within the scope of the appended claims each have several aspects, no single one of which is solely responsible for the desirable attributes described herein. Without limiting the scope of the appended claims, some prominent features are described herein.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 4 is an exemplary cyber progress index for use with the information security management improvement system in accordance with certain embodiments disclosed herein.

FIGS. 5A-10B depict an exemplary progressive critical domain-element matrix (table) for use in establishing a cyber progress index score in accordance with certain embodiments disclosed herein.

FIGS. 14A-D illustrate a set of exemplary user interfaces typically displayed during the baseline assessment process of FIG. 13 in accordance with certain embodiments disclosed herein.

FIG. 15 is an exemplary characteristic weighting table for use in accordance with certain embodiments disclosed herein.

FIG. 17 is an exemplary user interface depicting a cyber progress index score as generated in accordance with certain embodiments disclosed herein.

FIG. 18 is an exemplary user interface depicting a set of exemplary frameworks that may be assigned to a set of policies in accordance with certain embodiments disclosed herein.

FIG. 19 is an exemplary user interface depicting an exemplary set of framework requirements in accordance with certain embodiments disclosed herein.

DETAILED DESCRIPTION OF THE PREFERRED EMBODIMENTS

Figure 1A:
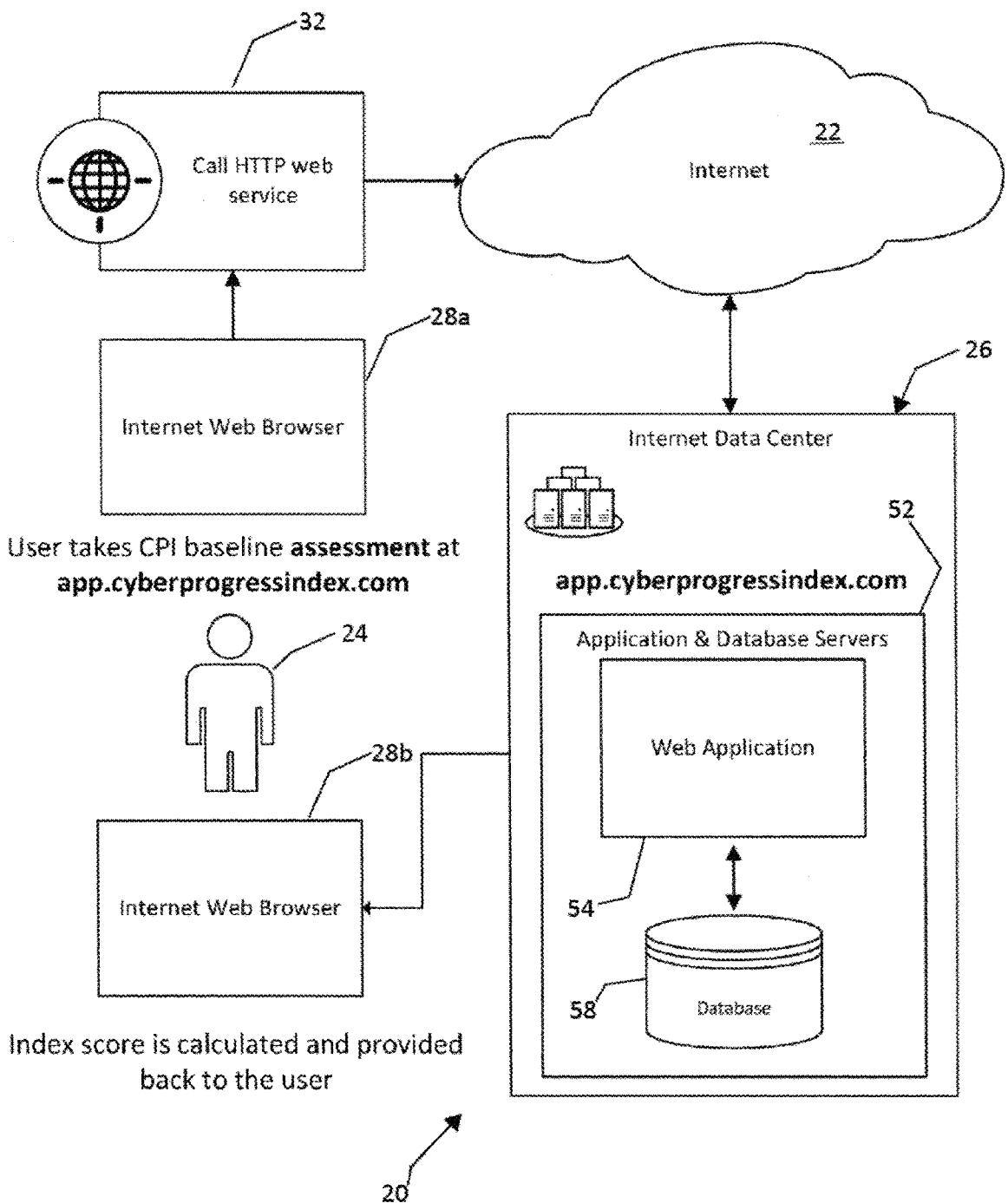
FIG. 1A is a schematic block diagram of an exemplary system architecture in which aspects of the information security management improvement system of the present disclosure may be employed in accordance with certain embodiments disclosed herein.

Overview of the Information Security Management Improvement System:

Referring now to FIGS. 1A-3, in general terms, an information security management improvement system (ISMIS), generally designated 20, allows an organization to repeatedly assess and measure the decision-making capability of the organization within an information security environment, and particularly within a set of four critical domains represented by a set of tables 68a-d (FIG. 3) establishing a set of requirements for progressing through the domains and establishing a running score indicating a level of compliance as well the level of interactivity between the domains at certain thresholds within the domains, compare the running score to a cyber progress index 60, and then provide systematic guidance for improving the decision-making capability of a management team responsible for managing information security issues. This ISMIS 20 and the accompanying methods of use are preferably provided as a computer implemented solution conducted over a distributed network system 22 and between a client user 24 and a remote data center, generally designated 26, and their respective representatives.

System Architecture:

Referring now to FIG. 1A, the ISMIS 20 is preferably implemented in a client-server configuration over a distributed network system, generally designated 22, such as the internet, although another wide area or even local area network may be used as well. On the client side, the ISMIS 20 includes a user 24 with access to a web browser 28a (client side) on a processing device, generally designated 30 (FIG. 2), such as a laptop, a desktop, or a mobile device placed in communication with a network service provider 32 who can place the user 24 in communication with the remote internet data center 26 (server side) over the network 22.

Figure 2:
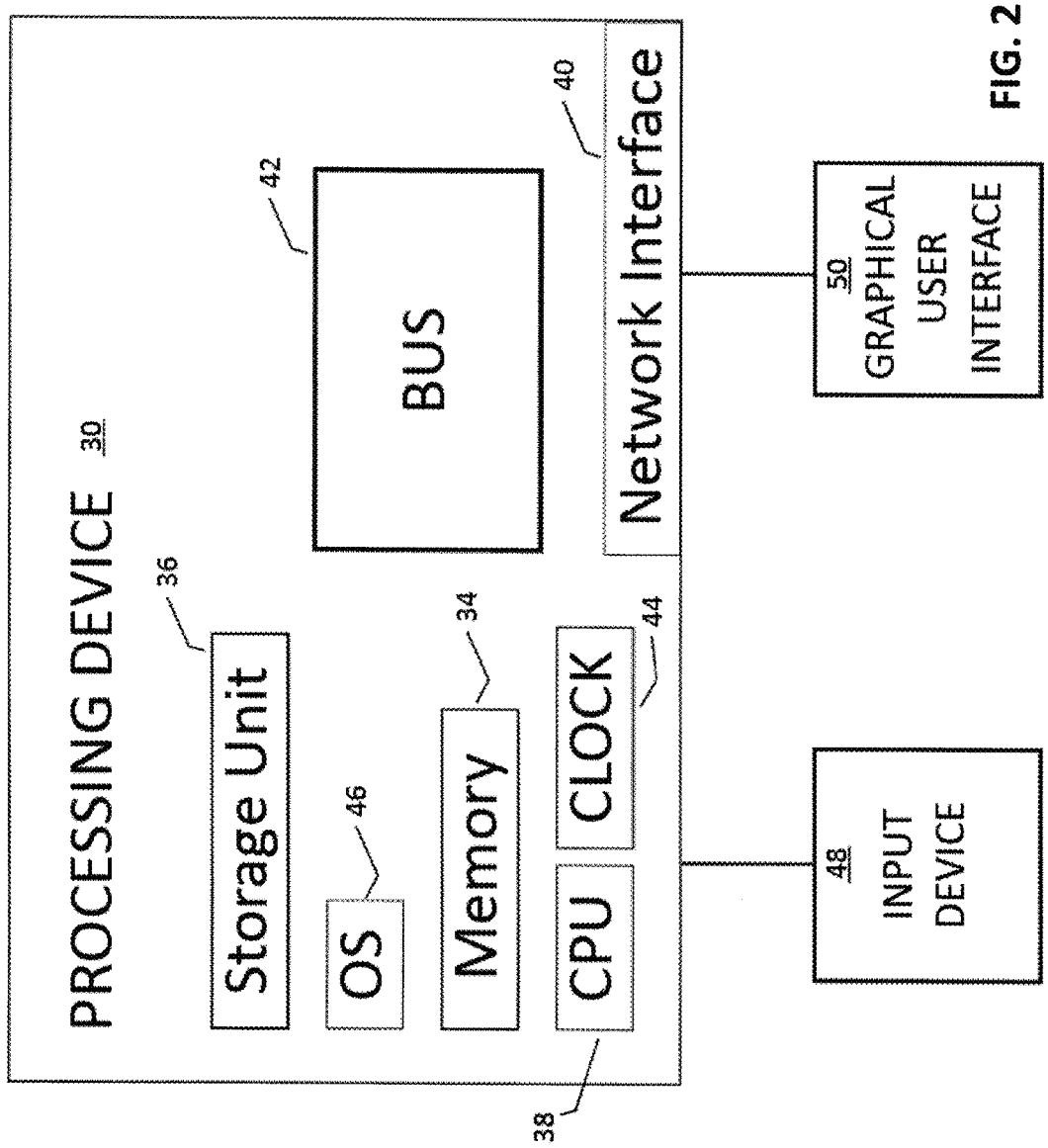
FIG. 2 is a schematic block diagram of an exemplary processing device for use with the information security management improvement systems of FIGS. 1A-1B.

Referring now to FIG. 2, the processing device 30 on the client side will typically have a memory unit 34, storage unit 36, processor 38, network interface device 40, a bus 42 or other device for transferring data between components, a clock 44, an operating system 46, means of inputting data (including, but not limited to, a keyboard, keypad, voice, stylus, mouse, touchscreen, and/or brain computer interface) 48, and a graphical user interface 50. Any suitable processing device capable of accessing and browsing the internet as would readily be understood by one of ordinary skill in the art familiar with network navigation may be used.

Referring back to FIGS. 1 and 3, on the server side of the ISMIS 20, the remote internet data center 26 includes one or more application and database servers, generally designated 52. At least one server further includes an internet compatible (web) application 54 providing the interface for generating a questionnaire 56 (FIG. 3) based on questions taken from a database 58 and outputting a current assessment 59 (FIG. 3) generated by a score calculator 61 (FIG. 3) programmed to generate the current assessment 59 (FIG. 3) based on a set of scaled responses 63 (FIG. 3) received from the user 24 on the client side of the ISMIS 20. The current assessment 59 may be provided as a report on a server-side web browser 28b, which may be the same as the client-side web browser 28a or different.

The application and database servers 52 have similar components to the processing device 30. One such exemplary application and database server may be provided by an Internet Information Services (IIS) for Windows Server with an Intel chipset or an analogous system would suffice as well. Such system is a flexible, secure and manageable Web server for hosting anything on the Web.

In this exemplary embodiment, the database 58 is a relational database programmed in the Microsoft SQL language. Another suitable database may be programmed in the Linux SGQL language as, for example, a PostgreSQL database. However, the database may be of the hierarchical, network, object, NoSQL, or NewSQL variety and programmed using any suitable database programming language for performing the tasks described herein.

Figure 1B:
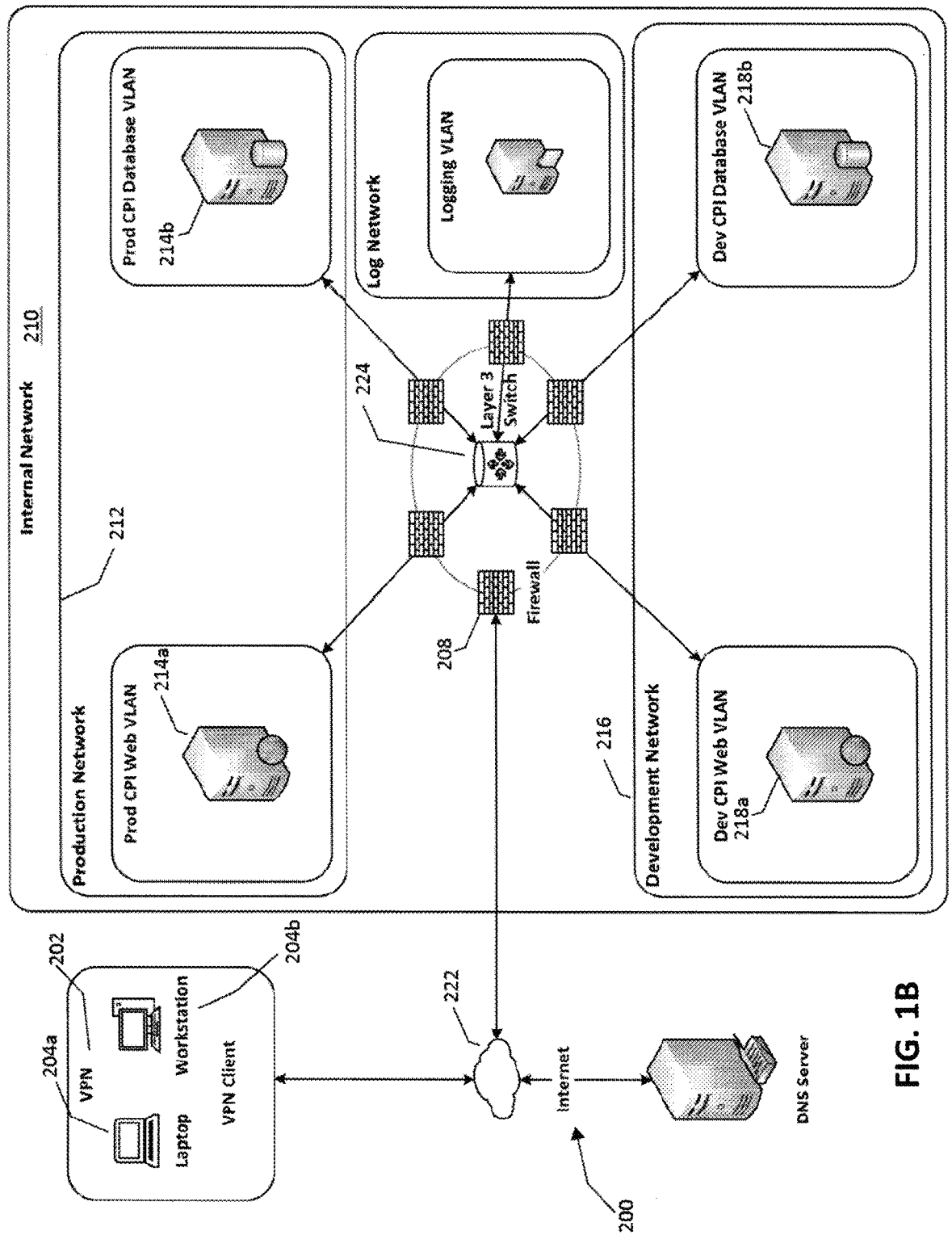
FIG. 1B is schematic block diagram of another exemplary system architecture in which aspects of the information security management improvement system of the present disclosure may be employed as well in accordance with certain embodiments disclosed herein.

Alternative System Architecture:

Referring now to FIG. 1B, the ISMIS 200 may alternatively be employed in a system architecture that includes a client-side Virtual Private Network (VPN) 202 with a device such as a laptop 204*a* or workstation 204*b* with distributed network navigation, input, and display capabilities such as the processing device 30 in FIG. 2. The VPN client is connected to the distributed network, in this example the internet 222 assisted by one or more domain name servers (DNS) 206 as would be understood by one of ordinary skill in the art. The user 24 (FIG. 1A) may communicate with the provider of the systems and processes of the embodiments disclosed herein over the internet 222 with communications passing through at one least one firewall 208 to communicate with the internal network 210 which includes a Production Network 212 with a cyber progress index (CPI) virtual local area network (VLAN) 214*a* responsible for managing the cyber progress index score and related baseline assessment, a CPI database VLAN 214*b* for maintaining the data tables employed by certain embodiments disclosed herein. The internal network further includes a development network 216 with a CPI web VLAN 218*a* and a CPI database VLAN 218*b* on the developer side of the system allowing for developer revisions to the ISMIS 200. A log network 220 with a logging VLAN 222 is provided to monitor and record traffic throughout the internal network. A layer switch 224 coordinates communications between the firewall and VLANs. It will be appreciated that either exemplary system architecture disclosed in FIGS. 1A-1B and in conjunction with FIG. 2 may be employed to manage the processes described below.

The Cyber Progress Index:

Turning now to FIGS. 1A-1B, 2, and 3, the database 58 in the data center 26 (or database VLAN 214*a*) includes several tools for assessing the health of an information security management system and suggesting how to improve such health. Such tools may be offered as a website that may also be mobile friendly, SAAS, downloadable program or software, mobile application (app), readable digital storage medium, or other suitable distributed network offering, and may be made available through a smart device, a workstation, a laptop, a desktop computer, or other suitable communication device constructed to communicate and navigate over a distributed network and provide a user interface such as a graphical user interface (GUI). In the exemplary embodiments disclosed herein, the primary tool in the cyber progress index toolset 55 accessible to the user 24 over the distributed network 22, 222 is the Baseline Assessment 56.

With continued reference to FIGS. 3-10B, one objective of the Baseline Assessment 56 is to establish a repeatable evaluation system to aid organizations in measuring the functional health of their information security program against the four critical domains or core functions 68*a-d* (FIG. 3) discussed below as well as how these functions work together to produce effective informed decision making with the ability to make and implement informed decisions for information security within their environment. This is starkly different than the objective of other available programs where certification or alignment to a benchmark is the primary objective. In general, the Baseline Assessment tool 56 generates a questionnaire 69 with a plurality of questions (1 . . . n) 71 based on criteria set forth in a progressive domain-element matrix 67 (FIGS. 5A-10B) in response to a user 24 request to the ISMIS 20, 200 over the distributed network 22, 222 and, after scoring the results to provide a current assessment 59, compares the results against a cyber progress index score 60 to inform the user where the user's enterprise stands in relation to a preferred score.

Referring now to FIG. 4, the Baseline Assessment tool 56 establishes a Cyber Progress Index Score 60 with a rating scale or range from a minimum three hundred to a maximum (preferred score) eight hundred fifty. Prior to taking an assessment, the user's score may be considered zero. More specifically, in order to set up a comparison or health benchmark and evaluate the health of the decision-making capability of the information security management system 20, 220, the Cyber Progress Index Score 60 is provided in the form of a matrix, spreadsheet, or table accessible from the database 58 by the servers 52, 214*c* in the data center 26 (FIG. 1A) or production network 212 (FIG. 1B). In this exemplary embodiment, the Cyber Progress Index Score 60 includes three columns 62*a-c* and nine rows 64*a-i* defining a set of twenty-seven cells 66*a-aa* with descriptive text data. More specifically, as shown in FIG. 4, the cell data is as follows: Cell 66*a*—"Rating Range", Cell 66*b*—"Rating Name", Cell 66*c*—"Rating Description", Cell 66*d* —"300.00-310.08", Cell 66*e*—"Undefined Security program with Limited Decision Capability", Cell 66*f*—"The security program system is undefined and there is a limited ability to make or implement security related decisions within the environment", Cell 66*g* "310.09-340.31", Cell 66*h*—"Defined Security Program with Limited Decision Capability", Cell 66*i*—"The security program system is defined but there is still a limited ability to make or implement security related decisions within the environment", Cell 66*j* —"340.32.-765", Cell 66*k* "Performed Security Program with Ad-hoc Decision Capability", Cell 66*l*—"The security program system is defined and operationally performed leading to some decision making and execution capability within the environment.", Cell 66*m* —"765.01-784.39", Cell 66*n*—"Performed and Measurable Security Program with Ad-hoc Decision Capability", Cell 66*o*—"The security program system is defined and operationally performed including the ability to measure the security posture of the organization. This capability creates a significant foundation to enable decision making and execution capability within the environment", Cell 66*p* —"784.40-786.37", Cell 66*q*—"Performed and Measured Security Program with Moderate Decision-Making Capability", and Cell 66*r*— "The security program system is defined and operationally performed including the ability to measure the security posture of the organization. In addition to this measurement capability, the organization has had its security posture measured utilizing these measurement processes. This capability creates both a significant foundation and supporting input data to enable decision making and execution capability within the environment", Cell 66*s* —"786.38-806.91", Cell 66*t*—"Informing Security Program with Effective Decision-Making Capability", and Cell 66u—"The implemented security program system is capable of collecting measurement information of the security posture within the environment and then effectively communicating this information to stakeholders. This situation creates an environment that enables a significant ability for stakeholders to make informed decisions about information security within the environment.", Cell 66v —"806.92-839.34", Cell 66w—"Improving Security Program with Effective Decision-Making and Execution Capability", and Cell 66x—"The implemented security program system is capable of collecting measurement information of the security posture within the environment and then effectively communicating this information to stakeholders. This situation creates an environment that enables a significant ability for stakeholders to make informed decisions about information security within the environment. Further, once these decisions are made, there is a strong capability and ability to implement these decisions once made.", Cell 66y —"839-35-850", Cell 66z—"Systemic Security Program with Perfected Decision-Making and Execution Capability", and Cell 66aa—"The decision and execution capability of the security program system within the environment is systemic with a strong ability for the organization to improve over time attributed to effective decision making by security program stakeholders."

The rating ranges (column 62a), and corresponding Rating Name (column 62b) and Rating Description (column 62c) in FIG. 4 range from the lowest health index tier (row 64b) to the highest health index tier (row 64i) and establish eight tiers of criteria 64b-64i (FIG. 3) for rating the information security management health of an organization. In this exemplary embodiment, the first and lowest tier 64b has a range of 300.00-310.08, the second tier 75b64c has a range of 310.09-340.31, the third tier 64d has a range of a 340.32-765, the fourth tier 64e has a range of 765.01-784.39, the fifth tier 64f has a range of 784.40-786.37, the sixth tier 64g has a range of 786.38-806.91, the seventh tier 64h has a range of 896.92-839.34, and the eighth and highest tier 64i has a range of 839.35-850.00.

The Critical Feature Matrix and Rating Framework:

In addition to the cyber progress index 60 (FIG. 4) described above as one element of the baseline assessment tool 56, a critical feature matrix (domain-element) and rating framework 67 (FIGS. 5A-10B) is provided to establish the criteria for each question (1 . . . n) 71 in the questionnaire 69 submitted to the user 24 upon request. While a waterfall approach in which the essential information security domains (benchmark, measurement, decision, and execution) were presented in order with connectors serving as transitions between each domain as a means of measuring a level of cross-domain engagement was disclosed in the priority provisional patent application 62/501,249, which is incorporated here in its entirety, alternative approaches in which the domains may be interspersed among one another along the progressive tier measurement system will now be discussed.

Turning now to FIGS. 5A-10B, the critical feature matrix 67 as stored in the database 58 in server 52 or 214c establishes the criteria for progressing from the lowest health index tier 64b to the highest health index tier 64i of the cyber progress index score 60. In this exemplary embodiment, FIGS. 5A-10B illustrate a table 67 that incorporates criteria from each critical information security domain 68a-d (benchmark, measurement, decision, and execution) and that defines an algorithm establishing a linear progression for leveling up through an increasingly difficult set of requirements. In this exemplary embodiment, a final criteria set 70ae establishes the penultimate score 132b tied to a temporal limit 73, such as a quarterly, semi-annual, or one-year period, for a user to go back to the beginning of the matrix 67 (and related questionnaire 69) to optimize the health compliance and domain interaction thus providing an iterative improvement approach. Such feature is provided since conditions are likely to change after an initial analysis and allows for improvement through iteration. In addition, a rating is assigned to both the level of compliance as defined by the criteria as well as the level of interaction between the domains at certain points in the progression as provided by the connectors 84e, 114e, 128e, and 132e as discussed in more detail below.

For ease of description, it will be understood that FIGS. 5A-10B represent one continuous table 67 resulting in a domain-element criteria matrix with a common header row 70a defining nine columns 72a-i and thirty criteria rows 70b-70ae that provide a basis for each question (1 . . . n) 71 in the questionnaire 69 of the baseline assessment tool 56. More specifically, the element descriptions under column 72f and the element characteristics under column 72g provide the basis of each question 71 per row 70b-70ae as set forth in the questionnaire that is presented to the user 24 via the client-side interface 28a, 202 for use in performing the baseline assessment. The domain-element (also referred to as the baseline assessment or element scoring) matrix 67 provides the criteria (elements, data, or values) for assessing of the health of an information security management system of an organization, including the level of compliance and the level of interaction within an information security system implementation by defining measurement types as either a Base (e.g. cell 74e) or a Connector (e.g. cell 84e), providing a score associated with each criteria, and maintaining a running score based on an accumulation of compliant answers to the questionnaire 69 as discussed below in more detail.

In general, the domain-element table 67, while continuous, is also divided into sections generally corresponding with the increasingly difficult to comply with cyber progress index tiers 64b-i which continue across FIGS. 5A-10B incorporating essential criteria corresponding to the four critical domains 68a-d and a final return domain 68e. The first portion of the table 67 is shown in FIGS. 5A-5B, the second portion in FIGS. 6A-6B, the third portion in FIGS. 7A-7B, the fourth portion in FIGS. 8A-8B, the fifth portion in FIGS. 9A-9B, and the sixth portion in FIGS. 10A-10B. It will be appreciated that the divisions are somewhat arbitrary within these figures and simply divided up for ease of description and illustration. The table 67 may be viewed as one long table or matrix or a series of connected tables. Overall, the table 67 includes cells that define criteria associated with a particular question provided in the questionnaire 69 issued to the user 24 to assess their information security management health of their associated enterprise. In this exemplary embodiment, the cells range from 74a-74i in the first row 70b, beneath header row 70a, in FIGS. 5A-5B, through cells 132a-132i in FIGS. 10A-10B for a matrix of two-hundred ten cells (30×7) excluding the header row. There are cells with common data and cells with unique data. As one example of cells having common data, among the element score column 72a, cells 74a, 76a, 78a, 86a, 88a, 90a, 92a, 94a, 98a all define an Element Score of "5.04."

In this exemplary embodiment, the table 67 is constructed as shown in FIGS. 5A-10B has a common header row 70a with the same set of column identifiers 72a-i. In this example, like numbers are used throughout the table 67 where the column heading is common. In this exemplary embodiment, the common header row 70a includes the titles of each column including an Element Score column 72a, a Running Score column 72b, A Rating Level column 72c, a Domain column 72d, a Measurement Type column 72e, an Element Description column 72f, an Element Characteristics column 72g, a Common Element Deliverables column 72h, and a Correlation to CISOSHARE Framework column 72i as seen in FIGS. 5A-5B for example. The columns may be viewed discretely or grouped as well. For example, the first three columns 72a-c may be combined to define the rating set. The fourth column 72d defines the associated primary domain (benchmark 68a, measurement 68b, decision 68c, or execution 68d). The fifth column 72e defines the measurement type as either "Base" or "Connector". A Base measurement type indicates a requirement within a single domain and makes up the bulk of the table rows. On the other hand, a Connector measurement type indicates the requirement from one domain to aid a requirement in another domain thus providing a cross-domain measurement. At certain points in the progression through the baselines assessment matrix 67, the connectors84e (Measurement Connector), 114e (Decision Connector), 128e (Execution Connector), and 132e (Benchmark-Return Connector), are used to measure the level of cross management or interaction between domains. More weight (per Column 72a—Element Score) is given at the connector points since this provides the level of interaction between the domains, which other ISMS do not do. The connectors are spread throughout the matrix 67 at various points and indicate a critical junction wherein at least certain elements of a lower domain are incorporated into a progressively higher domain. The sixth, seventh, and eighth columns 72f-72h in the matrix 67 further provide the progression criteria or compliance set by which the information security information system can improve its standing or rating by satisfying the requirements set forth in the associated compliance set. The final column 72i in the table 67 provides a correlation to a CISOSHARE (or Cyber Progress) Framework, which are specific frameworks such as policies, standards, charters, measurement processes, a findings database, and other implementation steps that provide one company's framework for implementing and improving a company's ISMS and are typically responsive to a user's Current Assessment Score 59 after using the Baseline Assessment tool 56.

Continuing with FIGS. 5A and 5B, this first portion of the table (or matrix) 67 defines the criteria associated with leveling up through the lowermost tiers 64b and 64c. In this example, tier 64b criteria is defined by rows 70b and 70c in the matrix 67 while tier 64c includes rows 70d-70g. Turning now to first portion of the table 67 as shown in FIGS. 5A-5B, the first portion of the table defining the first tier 64b is made up of a first row 70b defining a set of cells 74a-i (FIGS. 5A-5B) and a second row 70c defining a set of cells 76a-i (FIGS. 5A-5B) with descriptive text data. More specifically, in row 70b as shown in FIGS. 5A-5B, beneath the respective header columns 72a-i, the corresponding text data in each cell is as follows: Cell 74a-"5.04", Cell 74b —"305.04", Cell 74c—"Undefined Security Program with Limited Decision Capability", Cell 74d—"Benchmark", Cell 74e—"Base", Cell 74f—"There is a documented benchmark framework that illustrates all of the relationships between all security policy, standards, guidelines, program, program charter, and processes in the environment.", Cell 74g—"Defined wireframe that illustrates the relationship between each security policy, program, charter, standard, or process document within the organization.", Cell 74h—"—Security Documentation Map,—Research Supporting Analysis of Framework Drivers", Cell 74i—"-Security Framework Map,—Program Kick-off,—Program assessment".

The second row 70c, beneath the respective header columns 72a-i, the corresponding text data in each cell is as follows: Cell 76a —"5.04", Cell 76b —"310.08", Cell 76c—"Undefined Security Program with Limited Decision Capability", Cell 76d—"Benchmark", Cell 76e—"Base", and Cell 76f—"The documented benchmark framework must be derived from applicable regulatory and business requirements of the organization, as well as best practice standards within the information security domain.", Cell 76g—"—The framework should be aligned to organizational objectives, —The framework should be aligned to application regulations and best practice frameworks.", Cell 76h—"-Security Documentation Map,—Research Supporting Analysis of Framework Drivers.", and Cell 76i—"Security Process Guide—Policy Management Process". At this point, the end of the first tier (64b) (FIGS. 4 and 5A-5B) has been reached.

Continuing on with the second portion of table 67 up through the second tier 64c and turning to FIGS. 6A-6B, the cell data of row 70d is as follows: Cell 78a —"5.04", Cell 78b —"315.12", Cell 78c—"Defined Security Program with Limited Decision Capability", Cell 78d—"Benchmark", Cell 78e—"Base", Cell 78f-"All security policy, standards, guidelines, program, program charter, and processes must be documented in the environment and derived from a current documented benchmark framework", Cell 78g—"A review of the security documentation for the environment will align to the documented benchmark framework.", Cell 78h— "Documented Security Policy and Standards Document", Cell 78i—"Security Policy and Standards Document".

Referring now to row 70e, the cell data is as follows: Cell 80a —"7.92", Cell 80b —"323.04", Cell 80c-"Defined Security Program with Limited Decision Capability", Cell 80d—"Execution", Cell 80e—"Base", Cell 80f—"The security program must have a defined sub-program for a dedicated security project management that aligns to best practice.", Cell 80g-"The dedicated project capability within the environment will have a defined scope, roles and responsibilities, as well as mission and mandate.", Cell 80h— "Documented review of implemented project management function program and processes", and Cell 80i—"Defined Security Program Project Management Capability." In this example, the prior row domain was all described as the Benchmark domain 68a. This is the first switch to a different domain (in this case, the Execution domain 68d) in the second tier 64c as even at the lower tiers of the domain-element matrix 67, an enterprise may be required to satisfy basic criteria for each domain. However, both rows include a "Base" measurement type (column 72e).

The cell data of row 70f is as follows: Cell 82a —"3.96", Cell 82b —"327", Cell 82c—"Defined Security Program with Limited Decision Capability", Cell 82d—"Decision", Cell 82e—"Base", Cell 82f—"The communication system must be documented in the security program charter", Cell 82g—"The communication system for the security program will be defined in the security program charter with identified stakeholders that will receive communication, communication mechanisms for transferring information and defined communication artifacts.", Cell 82h—"Security program charter", and Cell 82i—"Security Program Charter— Defined communication system." While many of the cells contain just a single criteria, Cell 82i is an example of a cell having multiple criteria an a) Security Program Charter, and b) Defined Communication System. Other cells may incorporate single or multi-element criteria as well. In addition, row 70f switches to the Decision domain 68c from the Execution domain 68d.

The cell data in row 70g is as follows: Cell 84a —"8.67", Cell 84b —"335.67", Cell 84c—"Defined Security Program with Limited Decision Capability", Cell 84d—"Measurement", Cell 84e—"Connector", Cell 84f—"The measurement program must utilize the security policies and standards ratified for the organization as the benchmark for measurement in all measurement processes", Cell 84g—"A review of the measurement processes in the environment demonstrate use of the ratified documentation set as the element of measurement", Cell 84h—"Documented Measurement Processes", and Cell 84i—"Security Process Guide—Sub-program Processes". Yet another domain switch from the Decision domain 68c to the Measurement domain 68b is encountered here. In this instance, however, the measurement type (column 72e) is Connector in row 70g. Here is the first cross-domain threshold indicative of a level of cross-domain management between the Benchmark domain 68a and the Measurement domain 68b. This is the first instance of the Measurement domain in the table 67 and is a critical component (element) to assess the organization's "Measurement" status, and is therefore assigned a connector value for the measurement type. If the user is unable to demonstrate compliance with this cross-domain requirement at this juncture as established by a response to question 71 based on the criteria in row 70g, further progress will be inhibited until the requisite criteria are satisfied. This Connector requirement is more instructive about the level of cross-domain interaction, engagement, or management than a simple Base compliance measurement type. At this point, the end of tier 2 (64c) (FIGS. 4 and 5A-5B) has been reached.

The cell data in row 70h is as follows: Cell 86a —"5.04", Cell 86b —"340.71", Cell 86c "Performed Security Program with Ad-hoc Decision Capability", Cell 86d—"Benchmark", Cell 86e—"Base", Cell 86f—"The security program charter must identify and define all supporting sub-programs of work within the security effort", Cell 86g—"The charter will align to the ratified benchmark framework and therefore will identify all applicable programs for the security program", Cell 86h—"Documented Security Program Charter", and Cell 86i—"Security Program Charter."

The cell data in row 70i is as follows: Cell 88a —"5.04", Cell 88b —"345.71", Cell 88c-"Performed Security Program with Ad-hoc Decision Capability", Cell 88d—"Benchmark", Cell 88e—"Base", Cell 88f—"All security policy, standards, guidelines, program, program charter, and processes must be ratified by defined stakeholders within the environment.", Cell 88g—"All utilized security documentation in the environment will have been ratified by the implemented security documentation ratification process.", Cell 88h—"Documented Security Policy and Standards Document—Security Process Guide", and Cell 88i— "Policy Management process".

The cell data of row 70j is as follows: Cell 90a —"5.04", Cell 90b —"350.79", Cell 90c—"Performed Security Program with Ad-hoc Decision Capability", Cell 90d—"Benchmark", Cell 90e—"Base", Cell 90f—"All ratified security policy, standards, guidelines, program, program charter, and processes must be what is utilized within the environment", Cell 90g—"A review of the security documentation in use for the environment will align to the ratified documented benchmark framework", Cell 90h—"Documented Security Policy and Standards Document", and Cell 90i—"Security Policy and Standards Document".

The cell data of row 70k is as follows: Cell 92a —"5.04", Cell 92b —"355.83", Cell 92c—"Performed Security Program with Ad-hoc Decision Capability", Cell 92d—"Benchmark", Cell 92e—"Base", Cell 92f—"All security policy, standards, guidelines and processes must relate to each other in a hierarchal manner. Security policy statements must incorporate security standards or guidelines and must be unique with no duplicated or contradictory statements", Cell 92g—"A review of the security documentation for the environment will align to the documented benchmark framework", Cell 92h—"Documented Security Policy and Standards Document", and Cell 92i—"Security Policy and Standards Document".

The cell data of row 70l is as follows: Cell 94a —"5.04", Cell 94b —"360.87", Cell 94c—"Performed Security Program with Ad-hoc Decision Capability", Cell 94d—"Benchmark", Cell 94e—"Base", Cell 94f—"All underlying sub-programs identified within the security program charter must define all of the processes that are included within them", Cell 94g—'Each identified sub-program in the charter will identify each process included within the sub-program', Cell 94h—"Documented Security Program Charter", and Cell 94i—"Security Program Charter". At this point in the table 67, the end of tier 3 (64d) (FIGS. 4 and 6A-6B) has been reached.

Continuing on with FIGS. 6A-B and 7A-7B, the cell data of row 70m is as follows: Cell 96a —"405.04", Cell 96b —"765.91", Cell 96c—"Performed and Measured Security Program with Ad-hoc Decision Capability", Cell 96d—"Benchmark", Cell 96e—"Base", Cell 96f—"There is a defined Management process for establishing, reviewing and modifying the benchmark framework for the environment", Cell 96g—"Each defined and documented process within a sub-program will have all business rules, included tools, roles and responsibilities and step by step procedures", Cell 96h—"Documented Security Program Processes", and Cell 96i—"Security Process Guide—Measurement Processes".

The cell data of row 70n is as follows: Cell 98a —"5.04", Cell 98b —"770.95", Cell 98c—"Performed and Measured Security Program with Ad-hoc Decision Capability", Cell 98d—"Benchmark", Cell 98e—"Base", Cell 98f—"There is a defined Management process for establishing, reviewing and modifying the benchmark framework for the environment", Cell 98g—"The process must be documented according to organizational policy; —The process must include documented business rules, included tools, roles and responsibilities and step by step procedures. There must be adequate resources with requisite skills, and availability, as well as evidence that the process is performed as designed", Cell 98h—"Defined Policy Framework Management Process", and Cell 98i—"Security Process Guide—Policy Management Process".

The cell data of row 70o is as follows: Cell 100a —"1.98", Cell 100b —"772.93", Cell 100c—"Performed and Measured Security Program with Ad-hoc Decision Capability", Cell 100d—"Measurement", Cell 100e— "Base", Cell 100f—"The measurement processes enable measurement across an entire organization including all business units and areas of management", Cell 100g—"The defined scope of the measurement program for the organization is inclusive of any organizational area that stores, utilizes, manages or transmits information or data on behalf of an organization", Cell 100h—"Measurement Program Definition Document", and Cell 100i—"Security Program Charter".

The cell data of row 70*p* is as follows: Cell 102*a* —"1.98", Cell 102*b* —"774.91", Cell 102*c*—"Performed and Measured Security Program with Ad-hoc Decision Capability", Cell 102*d*—"Measurement", Cell 102*e*—"Base", Cell 102*f*—"The measurement processes must be defined within a security risk management program that is identified and defined within the security program charter", Cell 102*g*—"The measurement program for the organization aligns to the benchmark framework and is defined within the security program charter for the organization", Cell 102*h*—"Security Program Charter", and Cell 102*i*—"Security Program Charter".

The cell data of row 70*q* is as follows: Cell 104*a* —"1.98", Cell 104*b* —"776.89", Cell 104*c*—"Performed and Measured Security Program with Ad-hoc Decision Capability", Cell 104*d*—"Measurement", Cell 104*e*—"Base", Cell 104*f*—"The measurement processes must be documented with all business rules, included tools, roles and responsibilities and step by step procedures", Cell 104*g*—"Each defined and documented measurement process within the measurement program will have all business rules, included tools, roles and responsibilities and step by step procedures", Cell 104*h*—"Documented Measurement Processes", and Cell 104*i*—"Security Process Guide—Measurement Processes".

The cell data of row 70*r* is as follows: Cell 106*a* —"9.47", Cell 106*b* —"786.36", Cell 106*c*—"Performed and Measured Security Program with Moderate Decision-Making Capability", Cell 106*d*—"Measurement", Cell 106*e*—"Base", Cell 106*f*—"The measurement processes must utilize a consistent measurement methodology that is defined", Cell 106*g*—"A review of the utilized measurement methodology within each measurement process should be defined in the measurement process documentation;—The defined measurement methodology should be aligned with the objective of the process", Cell 106*h*—"Documented review of implemented measurement processes", and Cell 106*i*—"Security Process Guide—Measurement Processes". At this point, the end of tier 4 (64*e*) (FIGS. 4 and 7A-7B) has been reached.

With reference now to FIGS. 8A-8B and 9A-9B, the cell data of row 70*s* is as follows: Cell 108*a* —"1.98", Cell 108*b* —"788.34", Cell 108*c*—"Informing Security Program with Effective Decision-Making Capability", Cell 108*d*—"Measurement", Cell 108*e*—"Base", Cell 108*f*—"The findings from measurement activities must be managed in a central location", Cell 108*g*—"A central database of findings from measurement activities must be implemented; —This database should be inclusive of findings from all measurement activities", Cell 108*h*—"Centralized security findings database", and Cell 108*i*—"Security Findings Database".

The cell data of row 70*t* is as follows: Cell 110*a* —"1.98", Cell 110*b* —"790.32", Cell 110*c*—"Informing Security Program with Effective Decision-Making Capability", Cell 110*d*—"Measurement", Cell 110*e*—"Base", Cell 110*f*—"The processes for managing centralized findings from measurement activities must be appropriately documented within the environment", Cell 110*g*—"The centralized findings database management process will have all business rules, included tools, roles and responsibilities and step by step procedures", Cell 110*h* —"Centralized findings database Management process", and Cell 110*i*—"Defined Process Performance—Project Portfolio Management".

The cell data of row 70*u* is as follows: Cell 112*a* —"1.98", Cell 112*b* —"792.30", Cell 112*c*—"Informing Security Program with Effective Decision-Making Capability", Cell 112*d*—"Measurement", Cell 112*e*—"Base", Cell 112*f*—"The centralized findings database must include findings from measurement activities, collected utilizing the defined security risk management algorithm from 99.9% of in scope processes", Cell 112*g*—"A review of the centralized findings database management process demonstrates that at least 99.9% of the findings identified from all measurement activities are managed. Common in scope processes include:—All 3rd parties or suppliers that manage, transmit or store confidential information on behalf of the organization.—Any systems owned by the organization, at the application, database, network, operating system, and physical layers that manage, transmit or store confidential information on behalf of the organization.—Across all business units utilizing a recognized framework such as ISO 27001 or NIST 800-53—On all project based risk assessments—3rd party or supplier risk assessments—Any regulatory related risk assessments in which the organization is subjected.—All policy exception risk assessments for any system or processes that are still in the production environment", Cell 112*h*—"Review of centralized findings database", and Cell 112*i* —"Implemented Security Findings Database".

The cell data of row 70*v* is as follows: Cell 114*a* —"8.67", Cell 114*b* —"800.97", Cell 114*c*—"Informing Security Program with Effective Decision-Making Capability", Cell 114*d*—"Decision", Cell 114*e*—"Connector", Cell 114*f*—"The central management capability must integrate into the communication system for the organization and aggregated findings must be integrated into stakeholder reporting", Cell 114*g*—"A review of the centralized findings database management process demonstrates that there are process steps for integrating aggregated findings data into the organization communication system.—A review of the stakeholder reporting from the communication system is inclusive of relevant findings data from the centralized findings database", Cell 114*h*—"Review of centralized findings database Management process.-Review of the stakeholder reporting within the defined communication process", and Cell 114*i*—"Defined Centralized Findings Database Management Process-Resourcing.-Security Program Charter". As with the prior Connector in Cell 84*e*, a second Connector 114*e* is encountered in row 70*v*. This time, a connection between the Measurement domain 68*b* and the Decision domain 68*c* must be established in order for the user to progress further through the table 67 to improve the information security management health of the organization or enterprise. The question 71 here based on the element row 70*v* as posed to the user measures whether the organization has a central management capability that can make decisions based on information presented to stakeholders via the communication system and if findings are included in stakeholder reporting. Essentially, the question queries whether the organization is utilizing the communication system and integrating the communication system into the organization to make informed decisions. By way of example, the Connector value question based on element row 70*v* is in contrast to an earlier Base value question 71 based on element row 70*f* that is also a part of the Decision domain (Cell 82*d*) but is not considered a connector value question because that question based on element row 70*f* only measures if a communication system is documented and thus is domain specific and thus labeled with Measurement Type—Base.

The cell data of row 70*w* is as follows: Cell 116*a* —"3.96", Cell 116*b* —"804.93", Cell 116*c*—"Informing Security Program with Effective Decision-Making Capability", Cell 116*d*—"Decision", Cell 116*e*—"Base", Cell 116*f*—"The communication system must present information in a way it supports informed decision-making", Cell 116*g*—"A review of the reporting artifacts within the communication system will show evidence of the decisions that were to be evoked from the information. —For each of those decision points, all required content, required stakeholders to make the decision, and the delivery mechanism will be appropriate to enable a decision to be made", Cell 116*h*—"Defined security program system", and Cell 116*i*—"Security Program Charter;—Defined communication system". At this point, the end of tier 5 (64*f*) has been reached.

With continued reference to FIGS. 9A-9B, the cell data of row 70*x* is as follows: Cell 118*a*—"3.96", Cell 118*b*—"808.89", Cell 118*c*—"Improving Security Program with Effective Decision-Making and Execution Capability", Cell 118*d*—"Decision", Cell 118*e*—"Base", Cell 118*f*—"The stakeholders of the security effort, defined in the security program charter, must make security related decisions utilizing the communication system", Cell 118*g*—"A review of the performance of the communication system demonstrates that the proposed decisions that were evoked were made", Cell 118*h*—"Review of the effectiveness of stakeholder reporting within the defined communication process", and Cell 118*i*—"Security Program Charter;—Defined communication system".

The cell data of row 70*y* is as follows: Cell 120*a*—"1.98", Cell 120*b*—"810.87", Cell 120*c*—"Improving Security Program with Effective Decision-Making and Execution Capability", Cell 120*d*—"Measurement", Cell 120*e*—"Base", Cell 120*f*—"The measurement processes must be resourced appropriately so that they can perform at least 99.9% of the required assessments within the environment", Cell 120*g*—"A review of the measurement processes in the environment demonstrates that they perform at least 99.9% of the scheduled assessments with the process for the environment", Cell 120*h*—"Documented review of implemented measurement processes", and Cell 120*i*—"Defined Process Performance—Resourcing". The end of tier 6 (64*g*) has been reached at this point.

Turning now to FIGS. 10A-B, the final two tiers 64*h* and 64*i* will be described. More specifically, the cell data of row 70*z* is as follows: Cell 122*a*—"1.98", Cell 122*b*—"812.85", Cell 122*c*—"Improving Security Program with Effective Decision-Making and Execution Capability", Cell 122*d*—"Measurement", Cell 122*e*—"Base", Cell 122*f*—"The measurement processes must be implemented in the environment as designed, defined and documented", Cell 122*g*—"A review of the measurement processes in the environment align to what has been defined", Cell 122*h*—"Documented review of implemented measurement processes", and Cell 122*i*—"Security Process Guide—Measurement Processes".

The cell data of row 70*aa* is as follows: Cell 124*a*—"1.98", Cell 124*b*—"814.83", Cell 124*c*—"Improving Security Program with Effective Decision-Making and Execution Capability", Cell 124*d*—"Measurement", Cell 124*e*—"Base", Cell 124*f*—"The central findings management processes must be resourced appropriately so that at least 99.9% of produced findings are managed within the database", Cell 124*g*—"A review of the centralized findings database Management process demonstrates that there are adequate resources to perform the process as designed", Cell 124*h*—"Review of centralized findings database Management process", and Cell 124*i*—"Defined Centralized Findings Database Management process-Resourcing".

The cell data of row 70*ab* is as follows: Cell 126*a*—"7.92", Cell 126*b*—"822.75", Cell 126*c*—"Improving Security Program with Effective Decision-Making and Execution Capability", Cell 126*d*—"Execution", Cell 126*e*—"Base", Cell 126*f*—"The security program must have a dedicated security project management capability that is adequately resourced", Cell 126*g*—"A review of the dedicated security project management capability in the environment demonstrate that they perform at least 99.9% of the scheduled assessments with the process for the environment", Cell 126*h*—"Documented review of implemented project management function program and processes", and Cell 126*i*—"Defined Dedicated Security Project Management Process Performance—Resourcing".

The cell data of row 70*ac* is as follows: Cell 128*a*—"8.67", Cell 128*b*—"831.42", Cell 128*c*—"Improving Security Program with Effective Decision-Making and Execution Capability", Cell 128*d*—"Execution", Cell 128*e*—"Connector", Cell 128*f*—"The security program must implement management decisions via the established project management capability defined for the security program", Cell 128*g*—"A review of the dedicated security project management capability in the environment demonstrate that they successfully managed at least 99.9% of the generated decisions evoked from the defined communication system for the environment", Cell 128*h*—"Documented review of performance associated with the project management of projects that were derived from decisions evoked within the communication system", and Cell 128*i*—"Defined Dedicated Security Project Management Process Performance—Resourcing". In this Connector criteria as set forth in Cell 128*e*, a level of interaction between the Execution domain 68*d* and the Decision domain 68*c* must be demonstrated in order for the user to progress higher along the matrix 67 and thus obtain a higher current assessment score 59 and move up the Cyber Progress Index 60. In this example, the connector value question 71 based on element row 70*ac* inquires as to whether the organization is implementing the decisions that the organization (or responsible personnel) has made and utilizing their project management capability. Given the cross-domain engagement that is required to measure and satisfy this requirement, a Connector value is assigned to the Measurement Type (72*e*).

The cell data of row 70*ad* is as follows: Cell 130*a*—"7.92", Cell 130*b*—"839.34", Cell 130*c*—"Improving Security Program with Effective Decision-Making and Execution Capability", Cell 130*d*—"Execution", Cell 130*e*—"Base", Cell 130*f*—"All security program processes defined by the security program charter, as well as sub-programs must be adequately resourced, so they are performed as designed", Cell 130*g*—"A review of all of the defined processes in the environment demonstrate that they are performed as designed", Cell 130*h*—"Documented review of implemented security program processes in the environment", and Cell 130*i*—"Defined Process Performance—Resourcing". At this point, the end of tier 7 (64*h*) has been reached.

Continuing with FIGS. 10A-B, the cell data of row 70*ae* is as follows: Cell 132*a*—"10.66", Cell 132*b*—"850", Cell 132*c*—"Systemic Security Program with Perfected Decision-Making and Execution Capability", Cell 132*d*—"Benchmark", Cell 132*e*—"Connector", Cell 132*f*—"On at least an annual basis, environment changes from the execution of business decisions, as well as environment changes associated with the organization, must be communicated as inputs into the benchmark framework Management process", Cell 132*g*—"Security Process Guide—Security Program Review", Cell 132*h*—"Documented review of the implemented Security Program", and Cell 132*i*—"Security Process Guide—Security Program Review; and Security Process Guide—Policy Management process". In this instance, the Connector of Cell 132*e* indicates a level of cross-domain interaction between Execution domain 68*d* at this penultimate Tier 8 (64*i*) and the lower tier Benchmark domain 68*a* and provides the return path (return domain 68*e*) to the first benchmark row 70*b* thereby establishing an iterative process based on a temporal constraint 73 such as a one year review period.

In looking over the table 67, there are four connectors as shown in cell 84*e* (FIG. 5A), cell 114*e* (FIG. 9A), cell 128*e* (FIG. 10A), and cell 132*e* (FIG. 10A). The questions 71 posed to the user 24 based on each of these element rows (70*g*, 70*v*, 70*ac*, and 70*ae*) with Measurement Type value "Connector" measures the level of interaction between two or more domains. More specifically, the level of cross management, interactivity, or engagement between more than one domain, whether adjacent or not, is posed in the question and the user's response provides an indication of the level of cross-domain activity, which may be measured or scaled. For example, the level of interactivity (engagement or management) between the Benchmark domain 68*a* and any one of the other domains (Measurement 68*b*, Decision 68*c*, Execution 68*d*) may be measured and given a Connector value in the Measurement Type column (72*e*). For instance, the first connector, cell 84*e* in FIG. 5A, measures the level pertaining to the measurement domain 68*b* being tied to the benchmark domain 68*a*. If any of the domains are operating completely independently, then the connector will not be satisfied, and the security health assessment will score lower on the cyber progress index 60 (FIG. 4). The second connector, cell 114*e* (FIG. 9A) measures the level of interactivity between the measurement domain 68*b* and the decision domain 68*c*. The third connector, cell 128*e* in FIG. 10A, measures the level of interactivity between the decision domain 68*c* and the execution domain 68*d*. The final connector, cell 132*e* also in FIG. 10A, reconnects the execution domain back to the benchmark domain since the benchmarks may change as the user progresses through the algorithm provided in FIGS. 5A-10B. As these connectors are more important to determine the level of interactivity and cross management of the domains compared to simple compliance only systems, the connectors are weighted (Column 72*a*) more heavily for rating purposes. For example, characteristic weighting table is shown in FIG. 15 wherein a connector may be assigned the weight or element score of 10.66 in the benchmark domain 68*a* while the base measurement types are assigned a weight or element score of 5.04. A Connector in the Measurement domain 68*b*, Decision domain 68*c*, and Execution domain 68*d* are all weighted at 8.67. On the other hand, a Base in the Measurement domain is weighted at 1.98, at 3.96 in the Decision domain, and 7.92 in the Execution domain. Thus, satisfying a set of requirements associated with a connector boosts the user's overall score on the health index 60 (FIG. 4). The Connector value related assessment stands in contrast to the assessment based on the user's response to questions based on the other element rows with Measurement Type value "Base" in the domain-element table 67 as these Base value questions are specific to a single domain.

Figure 3:
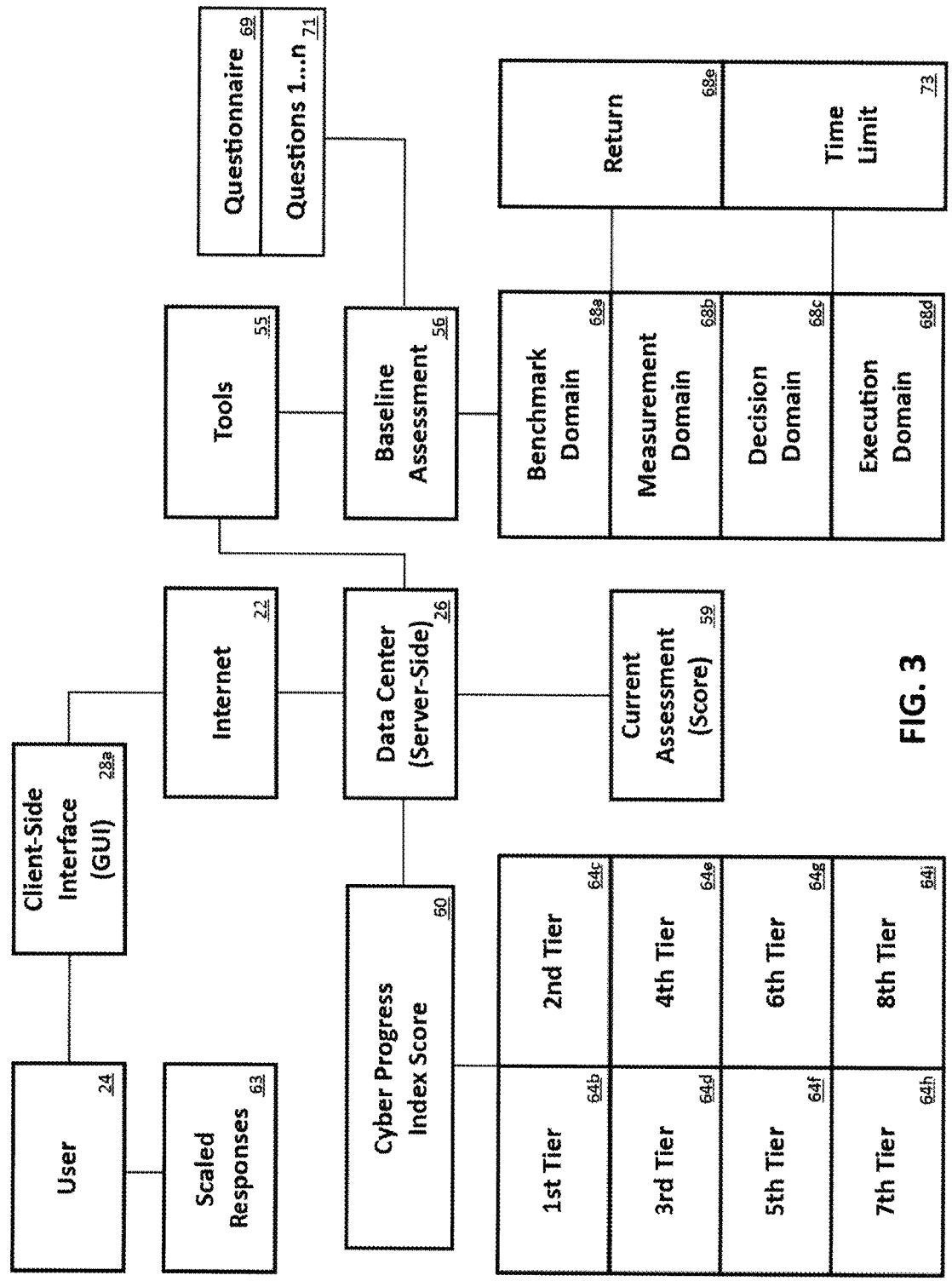
FIG. 3 is a schematic block diagram of an exemplary set of information security management improvement system components supplementing the schematic block diagrams of FIGS. 1A-1B.
Figure 8A:
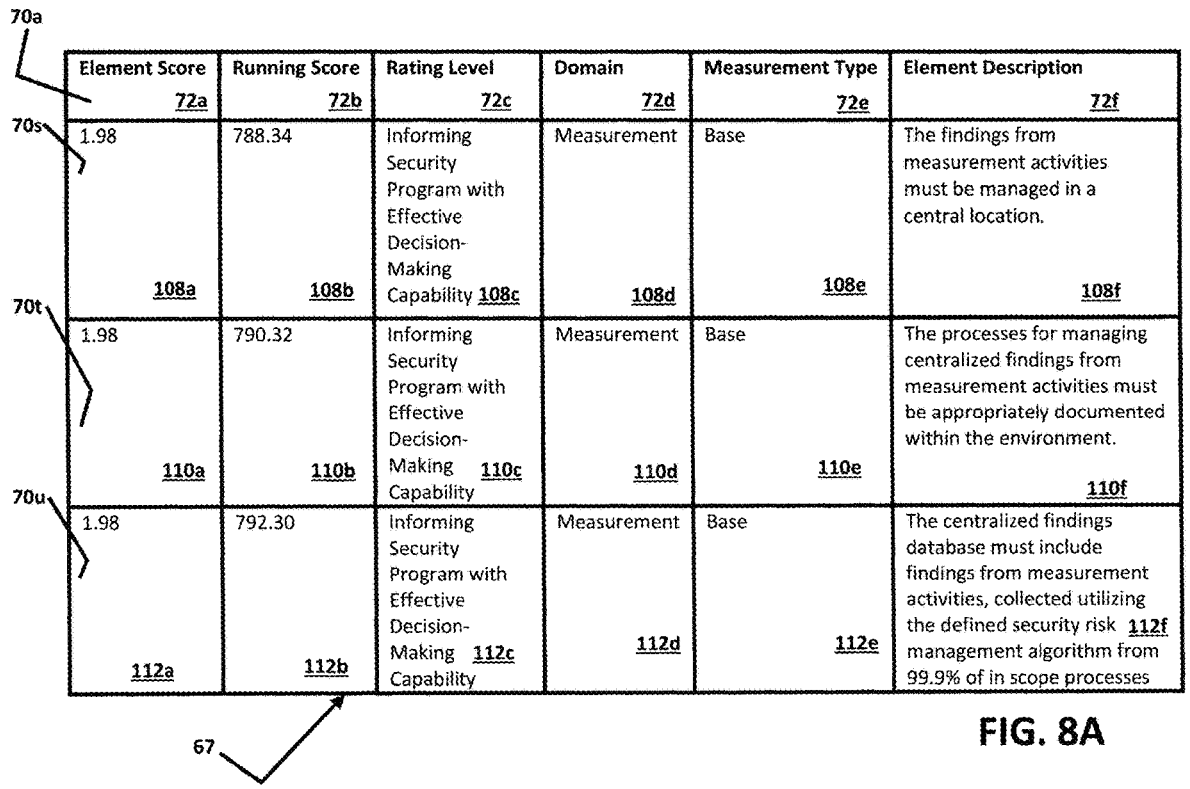
Figure 11:
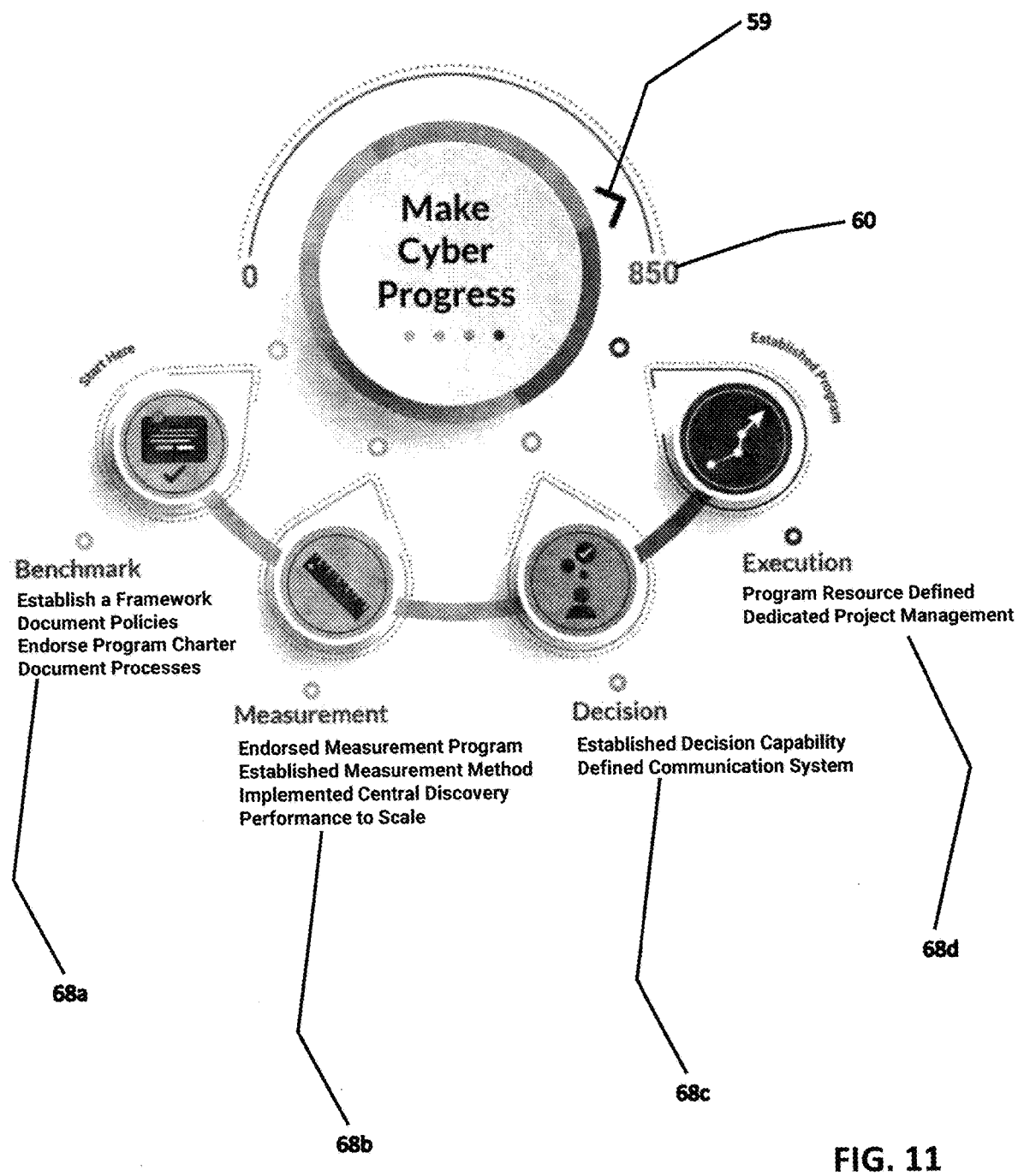
FIG. 11 is an exemplary schematic diagram overview of the domain elements for use in accordance with certain embodiments disclosed herein.

The Four Primary Essential Domains:

Referring now to FIGS. 3 and 5A-10B, the first domain relates to whether the organization has set a benchmark for security and is referred to as the benchmark domain 68*a* (FIGS. 3 and 11). This first domain establishes a definition for security in the environment that enables for a point of measurement. In most organizations, this is established for security thru a suite of security policies, standards, as well as, program and process documentation. The requirements that make up and illustrate how to progress through the benchmark domain are provided in rows 70*b*-70*d*, 70*h*-70*n*, and 70*ae* of the domain-element table 67 as shown in FIGS. 5A-10B.

The second domain relates to the organization's ability to measure against a benchmark and is referred to as the measurement domain 68*b* (FIGS. 3 and 11). This second domain investigates whether the organization organizes information from regular measurements of the environment against the established benchmark and then presents this information to management in a format that enables them to make an inform decision. The requirements that make up and illustrate how to progress through the measurement domain are provided in rows 70*g*, 70*o*-70*u*, and 70*y*-70*aa* of the domain-element table 67 as shown in FIGS. 5A-10B.

The third domain relates to whether the organization's information security implementation enables management decisions and is referred to as the decision domain 68*c* (FIGS. 3 and 11). This third domain investigates whether the organization has implemented processes for consistently measuring the environment against the established benchmark, which is generally managed through the security risk management program for the organization. The requirements that make up and illustrate how to progress through the decision domain are provided in rows 70*f* and 70*v*-*x* of the domain-element table 67 as shown in FIGS. 5A-10B.

The fourth domain relates to whether the organization supports execution of decisions and is referred to as the execution domain 68*d* (FIGS. 3 and 11). This fourth domain investigates the performance of security specific tasks associated with the security program, as well as supporting the business in the implementation of their security remediation activities as required. The requirements that make up and illustrate how to progress through the execution domain are provided in rows 70*e* and 70*ab*-70*ad* in the domain-element matrix 67 as shown in FIGS. 5A-10B. FIG. 11 provides a further schematic overview of these four essential information security management domains 68*a-d* along with a graphic representing the cyber progress index 60 with a maximum score of 850 and current assessment score indicator 59.

The return table 68*e* as shown in FIGS. 3 and 10A-10B is not a true independent domain but a vehicle for transferring the process back to the beginning of the benchmark table 68*a* so that the user may improve its rating after circumstances change. This last table 68*e* allows the information security management health assessment and improvement system 20, 200 to measure the security of the environment for changes, both in the security environment through the implementation of decisions as well as simply the security environment conditions changing due to changing organization conditions such as a merger, acquisition, growth, or loss. These changes to the security environment are then transitioned back to the first steps in the benchmark domain 68*a* where the framework and associated requirements and the process starts over again. Thus, in this exemplary embodiment, achieving the top score of 850.00 is only possible after the organization has undergone at least one full assessment cycle.

The decision-making capability analysis stemming from the organization's implementation of the four critical domains 68*a-d* are investigated and assessed by generating the questionnaire 69 using the critical features (indicated by the table cells) in the tables 67 to generate a set of questions for which the responses correspond to the critical features and that may be weighted to develop a running score that falls into one of the eight rating tiers 64*b-i* of the Cyber Progress Index 60 (FIG. 4). An exemplary assessment and scoring session will be explained in further detail below.

Figure 12:
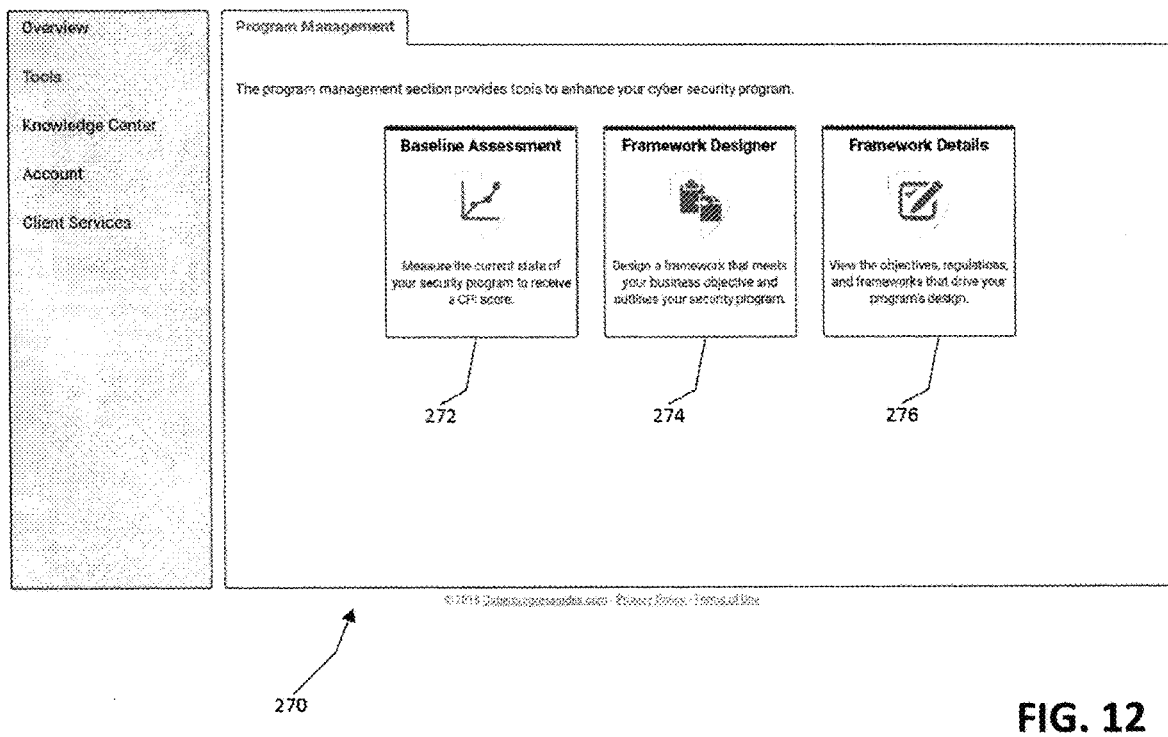
FIG. 12 is an exemplary user interface for selecting one or more processes in accordance with certain embodiments disclosed herein.
Figure 13:
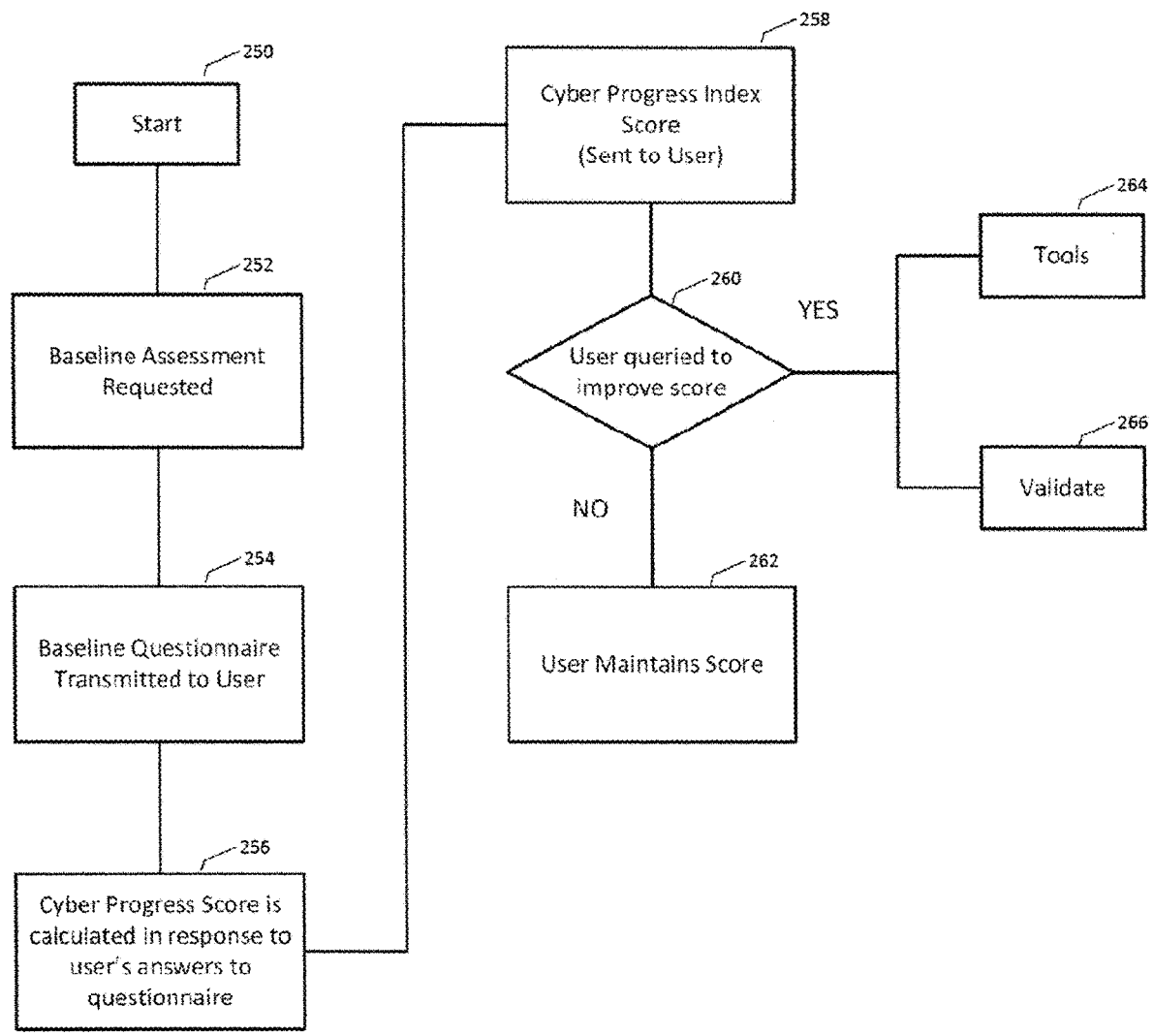
FIG. 13 is an exemplary flow diagram of a baseline assessment process for use in accordance with certain embodiments disclosed herein.

The Information Security Management Baseline Assessment Process:

Referring to FIGS. 1A-10B and 12-17, an exemplary process for using the baseline assessment tool 56 will now be discussed. Initially, it will be assumed that the user 24 has a valid login by setting up an account with the Baseline Assessment provider 26, 210 or is otherwise able to access the Baseline Assessment tool 56 over the distributed network 22, 222. Referring now to FIGS. 12-13, upon a successful login by accessing the website or mobile app provided by the internet data center 26 (FIG. 1A) or production network 212 (FIG. 1B) over the distributed network 22, 222 using conventional internet navigation techniques well familiar to one of ordinary skill in the art, at the start of the process (step 250 in FIG. 13), the user may be presented with a welcome screen or tool selection screen 270 with a Baseline Assessment icon 272, a Framework Designer icon 274, and a Framework Details icon 276 (FIG. 12). By selecting the Baseline Assessment icon, the user requests a baseline assessment 56 (step 252). In response to the user's request for a baseline assessment 56, the web application 54 of the internet data center 26 (or CPI web VLAN 214*a*) generates the questionnaire 69 from a list of questions 71 (1 . . . n) stored in the database 58 (or 214*c*) with each question based on a domain-element criteria associated with a particular row 70*b-70ae* in the matrix 67. In step 254, the questionnaire is transmitted to the client-side interface 28*a* (202) and displayed on the user's graphical user interface 50 (FIG. 2). The user 24 then inputs a set of scaled responses 63 (FIG. 3) corresponding to the questions 71 in the questionnaire 69 using the input device 48 on the client-side interface 28*a*. The questionnaire 69 includes a pre-selected set of questions designed to elicit a plurality of answers indicative of the organization's current state of information security management corresponding to the criteria set forth in the tables for each of the four domains 68*a-d*, either as the Base level or the Connector level. The questions are specifically tailored to each of the four different domains but also are indicative of the degree of interaction between the four domains 68*a-d* as established by the criteria for satisfying the connectors 84*e*, 114*e*, 128*e*, and 132*e*.

For example, referring now to FIGS. 14A-D, a question 71 displayed by the questionnaire 69 on the user's graphical user interface 50 may inquire whether the user as the representative seeking to receive a health assessment of the organization's information security system has established a formal reporting process. Available responses may range from zero, representing no formal reporting process, to ten, representing a formal reporting process, with responses in between representing various levels of implementing an informal reporting process. Alternatively, responses may be in the form of a binary YES/NO response. As shown in FIG. 14A for example, a benchmark question screen 280 as indicated by the domain indicator 282. A question 284 with an explanation 286 is presented to the user 24 along with a binary YES/NO response option 288 in this example. FIGS. 14B-D provide examples of a measurement question screen 290, decision question screen 300, and execution question screen 310. The user is presented with a series of questions 71 using the various screen types 280, 290, 300, and 310. In this exemplary baseline assessment, the user 24 is presented with questions 71 one at a time in order starting with a question based on the first criteria row 70*b* of the matrix 67 and continuing through the table until the user answers NO to a particular question. While the user may continue to response to all thirty questions 71 (corresponding to criteria set forth in rows 70*b-70ae*), only the results up until the first NO response are counted. Once the system 20, 200 determines that the user 24 has responded with a first NO, then the matrix 67 in the database 58 (or 214*c*) is consulted to determine a total running score (step 256 in FIG. 13). By way of example, if the user answered the first three questions YES followed by a NO response to the fourth question, then the user 24 would be assigned a running score of 315.12 (Cell 78*b* in FIG. 5A). This current assessment score 59 would then be compared by the processing device 30 to the data in the Cyber Progress Index 60. In this instance, the current assessment score of 315.12 would fall into the second tier 64*c* (Rating Range Column 66*a*—Cell 66*g* in FIG. 4. These responses 63 are fed back to the internet data center 26, 212 and stored in the database 58, 214*c* along with a unique client ID. Essentially, the binary response is treated as a 1 (YES) or a 0 (NO) and multiplied by the element score (Column 72*a*) corresponding to the row 70*b-70ae* associated with the question 71 presented to and responded to by the user 24 to calculate an individual question score. The response weights are also provided in the Characteristic Weighting Table (CWT) 320 (FIG. 15) depending on whether the measurement type associated with a question 71 are a Base type or a Connector type. As shown in FIG. 15, the CWT includes a domain column 322*a*, a base weight column 322*b*, and a connector weight column 322*c* are depicted wherein a connector may be assigned the weight or element score of 10.66 in the benchmark domain 68*a* while the base measurement types are assigned a weight or element score of 5.04. A Connector in the Measurement domain 68*b*, Decision domain 68*c*, and Execution domain 68*d* are all weighted at 8.67. On the other hand, a Base in the Measurement domain is weighted at 1.98, at 3.96 in the Decision domain, and 7.92 in the Execution domain. Other suitable weights may be used. For example, Cell 106*a* assigns a weight value of "9.47" to the element row 70*r* for a Measurement domain (106*d*), Measurement Type Base (106*e*). The individual question scores are then tallied by the processing device 30 resulting in a running score as determined by Column 72*b* in matrix 67 (FIGS. 5A-10B). In this exemplary embodiment, it will be appreciated that the questions 71 presented to the user 24 in response to a baseline assessment 56 request are taken from at least the associated data in the element description column 72*f* where the language uses mandatory language such as "must". This establishes whether a user is in compliance or not. If the user cannot respond to the question in the affirmative to the mandatory requirement set forth in the question based on the element description, this indicates a lack of compliance relative to the information security element posed by the question. A non-response may be considered non-compliant and treated accordingly.

As another example, in response to each question 71 from the questionnaire 69, instead of a binary YES/NO response, the user 24 may provide a level of compliance number falling within a range of zero to ten with ten being the high end of the range. If nothing has been implemented, a score of zero is assigned to that answer. Such scaled response may be multiplied by the element score Column 72*a* (FIGS. 5A-10B) to present a different scoring system to go along with an Cyber Progress Index adjusted accordingly to take into the greater answer range.

With continued reference to FIGS. 1A-1B and FIGS. 3 and 12-17, once the responses to all the questions 71 in the questionnaire 69 have been received from the user 24, the responses are stored in the database 58 (or 214c) along with a unique user ID and time and date stamp. Behind the generation of the current assessment score 59 are four primary considerations. The first consideration is that there are four domains 68a-d that have characteristics that are measured with questions in each domain. The domains 68a-d, and resulting questions within each of them, generally build on each other in the following domain order: 1. Benchmark (68a), 2. Ability to Measure Against Benchmark (68b), 3. Ability to make Decisions (68c) and then 4. Execution of Decisions (68d). The second consideration is that the possible score for a question is determined by the level of compliance established from the selected answer, the type of characteristic (Base or Connector) the question is asking about, as well as the domain a question is associated with. As discussed above, there are two types of characteristics (measurement types). The first is the Base Characteristic, which is a characteristic tied to or related to a specific domain. The second is the Connector Characteristic, which is a characteristic that utilizes attributes from compliance with a previous domain within the domain the Connector Characteristic is defined within. The third consideration is that the weighted scores are defined in the characteristic weighting table 320 (FIG. 15), which may be a lookup table stored in the database 58 (or 214c) as explained above. Base weight scores generally increase as an organization moves from one domain to another in the domain order that has been presented. Connector characteristics may have the same consistent weighting (except for the return connector which is weighted more heavily in this exemplary embodiment) but are weighted more heavily than their base counterparts since the connectors are indicative of a cross-domain managed information security system. The fourth consideration is that the total weighted index scores are established by adding all of the weights from affirmative answers together until you reach a non-compliant response. In this exemplary embodiment, the minimum score is 300 and the total maximum score is 850. This last consideration assumes that health decision making in an information security system improves only with the system implemented with the domains 68 a-d in the presented linear order.

At step 258 of FIG. 13, once determined, the current assessment score 59 is then relayed to the internet web browser 28b (or 202), which may be the same of the internet web browser 28a of the user side of the ISMIS 20, 200. The current assessment score includes a score falling within one of the Cyber Progress Index tiers 64b-64i (FIG. 4). This final index score may be relayed to the user 24 along with Cyber Progress index 60 to show the user where their organization falls relative to the level of compliance and interaction between the four domains 68a-d, which is especially relevant to the organization information security decision-making capability.

Figure 16:
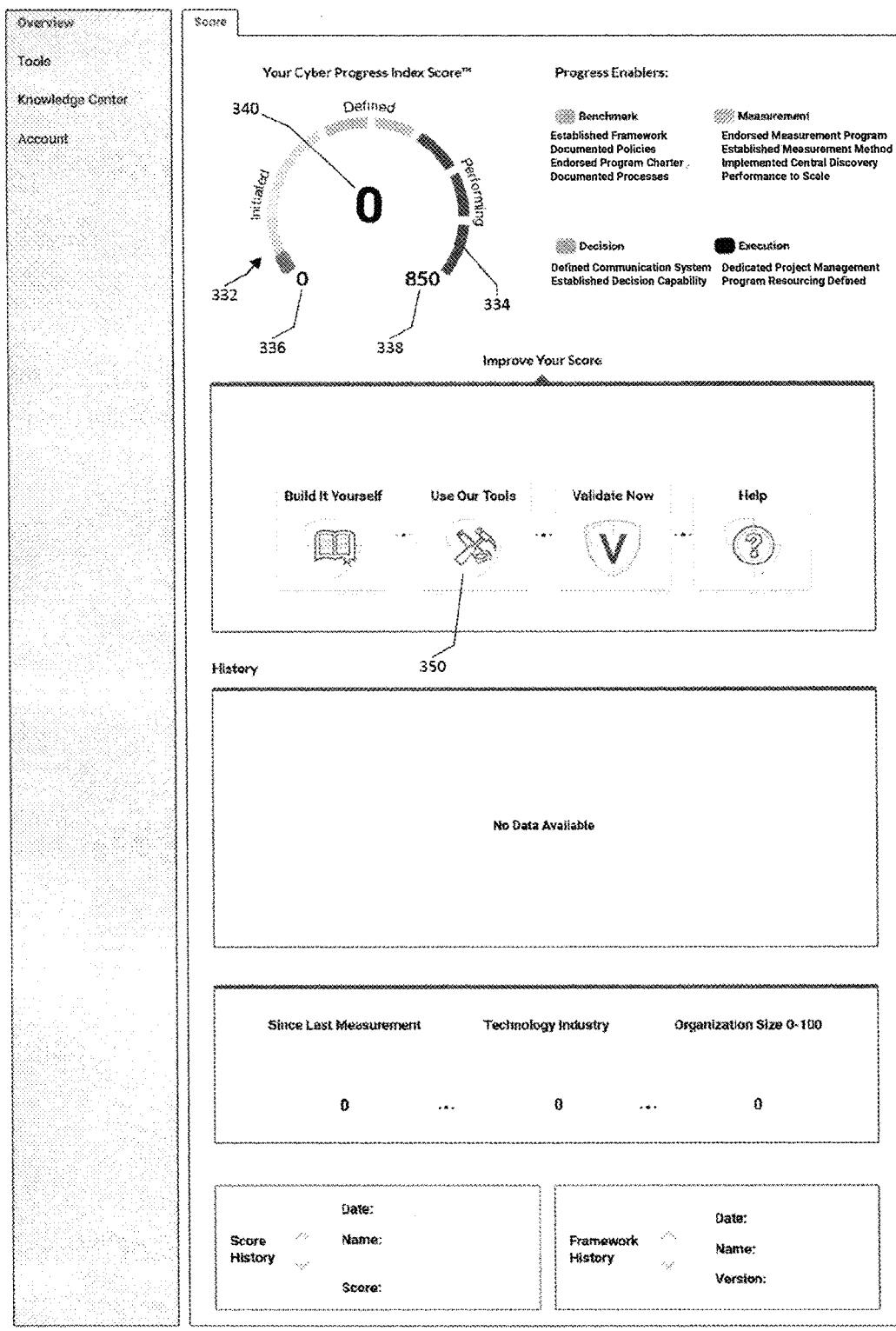
FIG. 16 is an exemplary user interface for navigating certain processes in accordance with certain embodiments disclosed herein.

Referring now to FIGS. 16-17, the user 24 may be presented with a results screen 330 including a graphic element 332 that indicates the Cyber Progress Index range 334 (e.g. a dial gauge as in FIGS. 16-17, or a bar graph, or other suitable comparison graphical icon representative of a comparison between the current assessment score and Cyber Progress Index, which may include representing the tiers depicted in FIG. 4) having a minimum 336 and a maximum 338 relative to the user's current assessment score indicator 340 to assist the user in visually gauging where their organization stands relative to the range established by the Cyber Progress Index 60 (FIGS. 3-4). With that information in hand, the user 24 or assessor will know which of the eight tiers 64b-i that the user's information security management health falls into and the associated rating name (column 62b) and rating description (column 62c) may be provided as well.

At this point, the user 24 may be queried by the system 20, 200 as to whether an improvement to the current assessment score 59 is of interest (step 260). If the user is not interested, then the current assessment score will remain the same (step 262). On the other hand, if the user is interested in improving the current assessment score of their organization, then the user may be queried to continue using other tools made available by the ISMIS 20, 200 to assist the user in improving the current assessment score 59 relative to the Cyber Progress Index 60.

Referring now to FIG. 16, the user may select the Toolset icon 350 to bring up the tool selection page 270 (FIG. 12). As one method of improving the current assessment score 59, the user 24 may select a framework designer icon 274. The user will then be presented with a short organizational questionnaire relating to the organization's demographics and structure including base of operation, industry, regions of operation, related industries, and publicly traded before proceeding to a second screen where the user is presented with a short questionnaire relating to the program drivers such as security effort objectives relating to concerned parties (stakeholders) and types of information assets and documents stored by the organization. In response to the answers provided by the user, a set of recommended frameworks are listed along with the organization summary from the responses. A further breakdown of each recommended framework is provided in a framework details page 360 (FIG. 18) wherein each recommended framework 362 is listed with an expand button 364 listing the process and associated framework. In addition, a requirements link 366 is provided indicating the number of requirements available. By selecting the requirements link 366, a requirements table 370 (FIG. 19) listing the frameworks and their associated requirements as shown for example in FIG. 19. Such details may be accessed using the framework details icon 276 on the tool selection page 270 (FIG. 12) as well.

As the current assessment score 59 provides a baseline and the results of the questionnaire 69 stored in the database 58 indicate the level of compliance in each domain 68a-d, the user may then be guided by the representative of the internet data center 26 as to how to improve in each domain 68a-d as well as cross domain compliance. This guidance may be provided in the form of tools provided by the ISMIS 20, 200 that include specific next steps for transitioning from the current assessment 59 within the Cyber Progress index 60 to a higher index score. Other guidance relates to the CISOSHARE Framework, which are the exact demonstrations associated with each requirement. With the current assessment score and responses set in hand, the internet data center representative may use such information as a basis for consulting and providing a process for an organization to level up through the tiers on the master health index. Essentially, the ISMIS 20, 200 creates a tool for a consulting service to help organizations improve their current assessment scores 59, and decision-making capability, based on the results obtained from using the ISMIS 20, 200. Prior to the framework established by the ISMIS and related process, organizations have not had a way to measure their decision-making capability since there was no repeatable way to measure the decision-making capability of the organization. While some of the recommendations for accomplishing a higher level of compliance in each domain 68a-d may coincide with recommendations to improve compliance, the primary objective of the ISMIS 20, 200 framework is to improve decision-making capability, as opposed to merely improving compliance in each domain area.

Jumping from Level to Level (Levelling Up):

It will be appreciated that the domain tables 68-e establish the criteria (requirements) for leveling up through and improving the running score of the health assessment starting with the lowest requirement (row 70b in FIGS. 5A-5B) to the highest requirement (row 70ae in FIGS. 10A-10B). While most progressions will be linear, in certain instances the organization may skip over certain requirements as, for instance, a certain requirement is inapplicable to that organization. Questions that are inapplicable may be omitted beforehand as well. At certain points along the progression, however, the connectors 84e, 114e, 128e, and 132e ensure that the domains are being managed inter-dependently to ensure the cross-decision capability of the organization is optimized. The connectors force the organization to prove or demonstrate that the associated information security program is systemic and defines those requirements. For example, the connectors require the organization to leverage all of the elements (requirements) within a domain in order to move on to the next higher domain. Thus, skipping past a connector without satisfying all the requirements in a domain is not possible in these exemplary embodiments. However, it will be appreciated the requirements set forth in the tables 68-e are exemplary and may be tailored to suit individual organizations and security environments thereby making the requirements (cell data) applicable to that organization.

Figure 20:
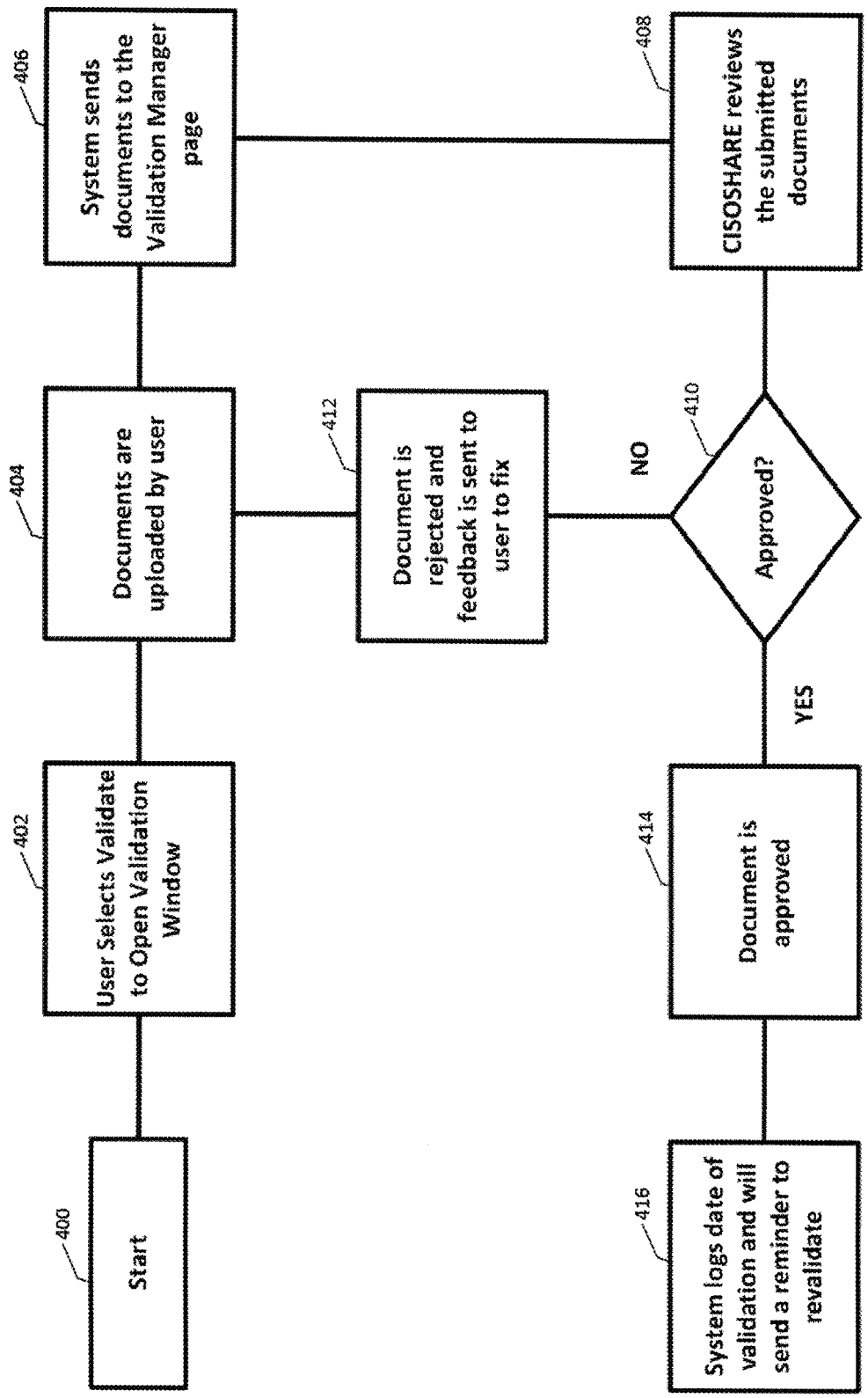
FIG. 20 is a process diagram illustrating an exemplary document validation process in accordance with certain embodiments disclosed herein.

Document Validation Process:

In addition to improving an organization information security management health using the above-described processes, associated documentation may be validated as well. Referring now to FIG. 20, at step 400, the user initiates a validation process, typically through a prompt responsive to an answer indicating possible documentation during the baseline assessment process (FIG. 13). The user then selects "Validate" to open a validation window (step 402). The corresponding documents are uploaded by the user 24 over the distributed network 22, 222 to the ISMIS provider (step 404). The system 20, 200 transmits the documents to a validation manager (Step 406). The validation manager reviews the documents (step 408). An approval determination is made at step 410. If the documents are not approved, the documents are rejected and sent back to the user with feedback (step 412). Once fixed, the documents may be uploaded back into the system to re-enter validation process. If the documents are approved, then the system 20, 200 logs the date of validation and sends a reminder letter to re-validate after a pre-determined or requested time period (steps 414, 416). Such validation process may be used to improve the user's current assessment score 59 as well.

As used herein, the following terminology may be explained as follows:

Benchmark framework: The benchmark framework is a wireframe that demonstrates the underlying requirements that are used to establish security program policy, standard, guideline, program, and procedure documentation. In addition to the requirements, it also establishes the relationships between these documents.

Documented policies: A security policy should live at the highest level of the hierarchy as it sets the overall direction for how an organization will protect information in a specific domain of security. It can be represented in one document or multiple ones that should represent all the domains of security.

Program charter: A security program charter defines the manner in which the security program will operate in the organization. This document will align the security program to organizational security policy and standards, and will most often cover: a) mission and mandate of program, b) defined scope of program, c) defined roles & responsibilities in the program, d) defined communication mechanism for security, and e) aligns with any policy or standards documents, among others.

Processes: Any process that is the responsibility of the information security program at an organization. Specific security processes that operate directly within the security program are: security program management, communication processes, security policy management, though this can vary. In addition, other common programs defined within the security program include security risk management, security architecture, training and awareness, and others. For each program, there will be specific processes that also relate to the overall security effort.

In general, the ISMIS 20 may be provided as a computerized system, method, and non-transitory medium with computer-readable instructions for assessing and improving decision-making capabilities in an information security environment using a distributed computer network to connect a plurality of users having a network interface with an input device and a graphical user interface to an internet data center having one or more servers and a database.

It will be appreciated that the system architecture has been described in terms of a client-server based architecture and conducted over a large-scale distribution network such as the internet. Acceptable system architecture alternatives include client-queue-client and peer-to-peer architecture as would be understood by one of ordinary skill in the art. However, it will also be appreciated that the method may be carried out analyzing a set of responses from a selected set of questions performed manually if the amount of data is manageable.

Certain objects and advantages of the invention are described herein. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Although this invention has been disclosed in the context of certain preferred embodiments, numerical ranges, and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure.

It is also contemplated that various combinations or sub-combinations of the specific features and aspects of the embodiments may be made and still fall within the scope of the invention. Accordingly, it should be understood that various features and aspects of the disclosed embodiments may be combined with or substituted for one another to form varying modes of the disclosed invention. Thus, it is intended that the scope of the present invention herein disclosed should not be limited by the particular disclosed embodiments described above.

What is claimed is:

1. An information security management improvement system for use with a community of users capable of communicating over a telecommunications network, the system comprising:

a database constructed to store a domain-element matrix including a plurality of sets of information security element criteria corresponding to a group of information security domains, each set of information security element criteria including an element score with at least one set of information security element criteria defining a level of compliance within at least one of the domains and at least one set of information security element criteria defining a level of cross-domain management between at least two of the domains, the domain-element matrix establishing a progressive order of the sets of information security element criteria, the progressive order including a plurality of ordered connectors defining progressively more difficult thresholds for satisfying cross-domain management;

the database further including a progress score index having a plurality of assessment tiers with associated scoring ranges, and a minimum score and a maximum score to define an overall scoring range;

a graphical user interface accessible to at least one user;

a processing device with at least one memory unit and a network interface in communication with the database and the graphical user interface over the telecommunications network and, in response to a request from at least one user over the telecommunication network to perform a baseline assessment, and upon accessing the memory unit, the processing device being instructed to:

generate a questionnaire having a plurality of questions for display on the user's graphical user interface, each question being based on at least one set of information security element criteria stored in the database;

receive at least one response per question posed to the user over the telecommunications network;

for each question answered in a first manner, assign a corresponding element score as defined by a set of information security element criteria associated with the question answered in the first manner;

aggregate a total of all element scores to define a current assessment score indicative of both a level of compliance and a level of cross-domain management;

generate a current assessment score indicator and the progress score index indicator;

transmit the current assessment score indicator and the progress score index indicator to the graphical user interface of the user requesting the baseline assessment to display a relative scoring comparison based on the current assessment score indicator and the progress score index indicator; and inhibiting further progress along the current assessment score until the thresholds are met as established by the progressive order of the domain-element matrix.

2. The information security management improvement system of claim 1 wherein:

the sets of information security element criteria include a domain indicator, a measurement type of either a base or a connector with the connector establishing a threshold of acceptable cross-domain management, and an element description in addition to the element score.

3. The information security management improvement system of claim 1 wherein:

the group of information security domains includes a benchmark domain, a measurement domain, a decision domain, and an execution domain with at least one of the domains interspersed among another domain within at least one set of information security element criteria.

4. The information security management improvement system of claim 1 wherein:

the group of information security domains includes a return domain wherein the user is directed to perform a re-assessment of the baseline assessment upon reaching a maximum score.

5. The information security management improvement system of claim 1 wherein:

the sets of information security element criteria include an element characteristic, a common element deliverable, and a correlation to at least one framework.

6. The information security management improvement system of claim 1 wherein:

the questions presented to the user are answerable with a binary response.

7. The information security management improvement system of claim 1 wherein:

the first manner of a response to a question is in the affirmative and a second manner of a response to a question is in the negative; and the processing device is further instructed to:

aggregate only those element scores corresponding to an affirmative answer up through a first response by the user in the negative.

8. The information security management improvement system of claim 1 wherein:

the current assessment score incorporates only those element scores corresponding to all answers responded to in the first manner prior to receipt of an answer responded to in a second manner from a user in response to the questions.

9. The information security management improvement system of claim 1 wherein:

the processor is further instructed to:

indicate to the user on the graphical user interface one or more documents available for validation in response to at least one question.

10. The information security management improvement system of claim 1 wherein:

at least one set of information security element criteria includes a measurement type designated a base indicating that the question is related to a single specific domain.

11. The information security management improvement system of claim 1 wherein:

at least one set of information security element criteria includes a measurement type designated a connector indicating that the question is related to more than one domain, the connector being indicative of a level of interactivity between multiple domains and providing a threshold inhibiting further progress through the assessment tiers until satisfied.

12. The information security management improvement system of claim 1 wherein:

at least one set of information security element criteria includes a base measurement type and at least one set of information security element criteria includes a connector measurement type with the element score associated with the connector measurement type being weighted higher than the element score associated with the base measurement type.

13. A method of improving the information security management of an organization, the method comprising:
providing a database constructed to store a domain-element matrix including a plurality of sets of information security element criteria corresponding to a group of information security domains, each set of information security element criteria including an element score with at least one set of information security element criteria defining a level of compliance within at least one of the domains, and at least one set of information security element criteria defining a level of cross-domain management between at least two of the domains, the database further including a progress score index having a plurality of assessment tiers with associated scoring ranges, and a minimum score and a maximum score to define an overall scoring range, the domain-element matrix establishing a progressive order of the sets of information security element criteria, the progressive order including a plurality of ordered connectors defining progressively more difficult thresholds for satisfying cross-domain management;
providing a graphical user interface accessible to at least one user;
providing a processing device with at least one memory unit and a network interface in communication with the database and the graphical user interface over the telecommunications network, and upon accessing the memory unit the processing device being programmed to perform at least the following steps in response to a request from at least one user over the telecommunication network to perform a baseline assessment:
generating a questionnaire having a plurality of questions for display on the user's graphical user interface, each question being based on at least one set of information security element criteria stored in the database;
receiving at least one response per question posed to the user over the telecommunications network;
for each question answered in a first manner, assigning a corresponding element score as defined by a set of information security element criteria associated with the question answered in the first manner;
aggregating a total of all element scores to define a current assessment score indicative of both a level of compliance and a level of cross-domain management;
generating a current assessment score indicator and the progress score index indicator;
transmitting the current assessment score indicator and the progress score index indicator to the graphical user interface of the user requesting the baseline assessment; and
inhibiting further progress along the current assessment score until the thresholds are met as established by the progressive order of the domain-element matrix; and
displaying a relative scoring comparison based on the current assessment score indicator and the progress score index indicator on the user's graphical user interface.

14. The method of improving the information security management of an organization as set forth in claim 13 further comprising:
assigning a base measurement type or a connector measurement type to each set of information security element criteria; and
assigning a higher scoring weight to each set of information security element criteria assigned a connector measurement type relative to those sets of information security element criteria assigned a base measurement type.

15. The method of improving the information security management of an organization as set forth in claim 13 further comprising:
correlating a first set of information security element criteria to a benchmark domain, a second set of information security element criteria to a measurement domain, a third set of information security element criteria to a decision domain, and a fourth set of information security element criteria to an execution domain.

16. The method of improving the information security management of an organization as set forth in claim 13 further comprising:
returning a user to the initial question in the questionnaire after a time period following completion of the entire questionnaire and attaining the maximum score of the progress score index.

17. A non-transitory medium with computer-readable instructions stored thereon to be executed by a processing device operable to be placed in communication with a user interface including at least one input device over a telecommunications network, the computer-readable instructions directing the processing device to response to a user's request to conduct a baseline assessment of a user's information security management system over the telecommunications network by:
accessing a database constructed to store a domain-element matrix including a plurality of sets of information security element criteria corresponding to a group of information security domains including a benchmark domain, a measurement domain, a decision domain, and an execution domain, each set of information security element criteria including an element score with at least one set of information security element criteria defining a level of compliance within at least one of the domains, and at least one set of information security element criteria defining a level of cross-domain management between at least two of the domains, the database further including a progress score index having a plurality of assessment tiers with associated scoring ranges, and a minimum score and a maximum score to define an overall scoring range, the domain-element matrix establishing a progressive order of the sets of information security element criteria, the progressive order including a plurality of ordered connectors defining progressively more difficult thresholds for satisfying cross-domain management;
generating a questionnaire having a plurality of questions for display on the user's graphical user interface, each question being based on at least one set of information security element criteria stored in the database;
receiving at least one response per question posed to the user over the telecommunications network;
for each question answered in a first manner, assigning a corresponding element score as defined by a set of information security element criteria associated with the question answered in the first manner;

aggregating a total of all element scores to define a current assessment score indicative of a level of compliance and a level of cross-domain management;

generating a current assessment score indicator and the progress score index indicator;

transmitting the current assessment score indicator and the progress score index indicator to the graphical user interface of the user requesting the baseline assessment for displaying a relative scoring comparison based on the current assessment score indicator and the progress score index indicator on the user's graphical user interface; and inhibiting further progress along the current assessment score until such thresholds are met in an established order.

\* \* \* \* \*